US008041193B2

(12) United States Patent
Yoo et al.

(10) Patent No.: US 8,041,193 B2
(45) Date of Patent: Oct. 18, 2011

(54) RECORDING MEDIUM HAVING DATA STRUCTURE FOR MANAGING REPRODUCTION OF AUXILIARY PRESENTATION DATA AND RECORDING AND REPRODUCING METHODS AND APPARATUSES

(75) Inventors: Jea Yong Yoo, Seoul (KR); Kang Soo Seo, Kyunggi-do (KR); Byung Kin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1094 days.

(21) Appl. No.: 10/960,485

(22) Filed: Oct. 8, 2004

(65) Prior Publication Data

US 2005/0084247 A1    Apr. 21, 2005

(30) Foreign Application Priority Data

Oct. 15, 2003  (KR) .................. 10-2003-0071905

(51) Int. Cl.
*H04N 5/89* (2006.01)
*H04N 5/92* (2006.01)
*H04N 5/82* (2006.01)
*H04N 5/80* (2006.01)

(52) U.S. Cl. ........ 386/336; 386/326; 386/244; 386/246; 386/247

(58) Field of Classification Search ............. 386/95, 386/46, 111–112, 69, 336, 326, 244, 246–247
See application file for complete search history.

(56) References Cited

U.S. PATENT DOCUMENTS

| 4,040,088 A | 8/1977 | Hannan |
| 5,519,443 A | 5/1996 | Salomon et al. |
| 5,949,752 A | 9/1999 | Glynn et al. |
| 5,999,255 A | 12/1999 | Dupée et al. |
| 6,115,077 A | 9/2000 | Tsukagoshi |
| 6,204,883 B1 | 3/2001 | Tsukagoshi |
| 6,219,043 B1 | 4/2001 | Yogeshwar et al. |
| 6,253,221 B1 | 6/2001 | Kim |
| 6,275,457 B1 | 8/2001 | Maeda |
| 6,288,900 B1 | 9/2001 | Johnson et al. |
| 6,288,990 B1 | 9/2001 | Fujiie et al. |
| 6,381,513 B1 | 4/2002 | Takase et al. |
| 6,452,609 B1 | 9/2002 | Katinsky et al. |
| 6,477,185 B1 | 11/2002 | Komi et al. |
| 6,763,178 B1 | 7/2004 | Suzuki et al. |

(Continued)

FOREIGN PATENT DOCUMENTS

CN    1153981 A    7/1997

(Continued)

OTHER PUBLICATIONS

International Search Report dated Jan. 19, 2005.

(Continued)

*Primary Examiner* — Helen Shibru
(74) *Attorney, Agent, or Firm* — Harness, Dickey & Pierce, P.L.C.

(57) ABSTRACT

In the data structure for managing reproduction of text subtitle data, a recording area stores at least one subplayitem. The subplayitem identifies more than one clip information file name, and each clip information file named by the subplayitem indicates an associated clip of auxiliary presentation data to reproduce from the recording medium. The auxiliary presentation data in each clip is associated with at least a portion of main presentation data recorded on the recording medium, and the subplayitem indicates a single presentation interval for the associated clips.

27 Claims, 19 Drawing Sheets

U.S. PATENT DOCUMENTS

| | | | |
|---|---|---|---|
| 7,197,234 B1 | 3/2007 | Chatterton | |
| 7,324,119 B1 | 1/2008 | Puri et al. | |
| 7,558,467 B2 * | 7/2009 | Seo et al. | 386/248 |
| 2001/0030710 A1 | 10/2001 | Werner | |
| 2002/0006271 A1 | 1/2002 | Winter et al. | |
| 2002/0135607 A1 | 9/2002 | Kato et al. | |
| 2002/0194618 A1 | 12/2002 | Okada et al. | |
| 2003/0021586 A1 | 1/2003 | Suh | |
| 2003/0156504 A1 | 8/2003 | Kanegae et al. | |
| 2003/0190147 A1 | 10/2003 | Lee | |
| 2003/0202431 A1 | 10/2003 | Kim et al. | |
| 2003/0235406 A1 | 12/2003 | Seo et al. | |
| 2004/0001699 A1 | 1/2004 | Seo et al. | |
| 2004/0081434 A1 | 4/2004 | Jung et al. | |
| 2004/0101285 A1 | 5/2004 | Seo et al. | |
| 2005/0008339 A1 | 1/2005 | Kuroiwa et al. | |
| 2005/0019007 A1 * | 1/2005 | Kato et al. | 386/69 |
| 2005/0084248 A1 * | 4/2005 | Yoo et al. | 386/95 |
| 2005/0105888 A1 * | 5/2005 | Hamada et al. | 386/95 |
| 2005/0147387 A1 | 7/2005 | Seo et al. | |
| 2005/0196140 A1 | 9/2005 | Moteki | |
| 2005/0201718 A1 | 9/2005 | Kato | |
| 2006/0098936 A1 * | 5/2006 | Ikeda et al. | 386/46 |
| 2006/0146660 A1 * | 7/2006 | Ikeda et al. | 369/30.13 |
| 2006/0153532 A1 | 7/2006 | McCrossan et al. | |
| 2006/0156358 A1 | 7/2006 | Adolph et al. | |
| 2006/0288302 A1 * | 12/2006 | Yahata et al. | 715/764 |
| 2007/0127885 A1 | 6/2007 | Seo et al. | |
| 2008/0253734 A1 * | 10/2008 | Kang et al. | 386/46 |

FOREIGN PATENT DOCUMENTS

| | | |
|---|---|---|
| CN | 1385857 | 12/2002 |
| CN | 1399467 A | 2/2003 |
| CN | 1428770 | 7/2003 |
| CN | 1985857 | 6/2007 |
| EP | 0737009 A2 | 10/1996 |
| EP | 0737979 A2 | 10/1996 |
| EP | 0 791 925 | 8/1997 |
| EP | 0 942 609 | 9/1999 |
| EP | 1 173 031 A1 | 1/2002 |
| EP | 1 198 132 | 4/2002 |
| EP | 1 280 347 | 1/2003 |
| EP | 1 408 505 | 4/2004 |
| EP | 1 614 108 | 10/2004 |
| EP | 1 643 765 | 4/2006 |
| EP | 1 204 280 | 5/2008 |
| GB | 1 556 366 | 11/1979 |
| GB | 1 586 431 | 3/1981 |
| JP | 60-179261 | 9/1985 |
| JP | 08-273304 | 10/1996 |
| JP | 09-035458 | 2/1997 |
| JP | 11-176137 | 7/1999 |
| JP | 2001-135066 | 5/2001 |
| JP | 2002-025197 | 1/2002 |
| JP | 2002-101389 | 4/2002 |
| JP | 2002-158971 | 5/2002 |
| JP | 2002-247526 | 8/2002 |
| JP | 2003-134440 | 5/2003 |
| JP | 2003-249057 | 9/2003 |
| JP | 2003-283942 | 10/2003 |
| RU | 2196389 | 1/2003 |
| RU | 2229174 | 5/2004 |
| WO | WO 99/22516 | 5/1999 |
| WO | WO 02-075739 | 9/2002 |
| WO | WO 03/056560 A1 | 7/2003 |
| WO | 2004036574 * | 4/2004 |
| WO | WO 2004/030356 | 4/2004 |
| WO | WO 2004/034398 A1 | 4/2004 |
| WO | WO 2004/036574 | 4/2004 |
| WO | WO 2004/056105 | 7/2004 |
| WO | WO 2004/066281 | 8/2004 |
| WO | WO 2004/093064 | 10/2004 |
| WO | WO 2004/098186 A1 | 11/2004 |
| WO | WO 2005/031740 | 4/2005 |
| WO | WO 2005/074394 | 8/2005 |
| WO | WO 2005/074399 | 8/2005 |

OTHER PUBLICATIONS

European Office Action corresponding to European Application No. 04774324.0 dated Oct. 21, 2008.
"Digital Video Broadcasting (DVB)" ETSI Standards, European Telecommunications Standards Institute, Sophia-Antipo, FR, vol. BC, No. V121, Jun. 2002, XP014001876 ISSN: 0000-0001.
European Search Report dated Jan. 31, 2005.
"White paper Blu-Ray Disc Format: 2.B Audio Visual Application format specifications for BD-ROM", Mar. 2005.
Office Action for corresponding Russian Application No. 2006116489/28(017941) dated Feb. 18, 2009 and English translation thereof.
Russian Office Action corresponding to Russian Application No. 2006116489/28 (017941) dated Oct. 30, 2008.
Office Action for corresponding Japanese Application No. 2006-535261 dated May 8, 2009 and English translation thereof.
Notice of Allowance by Russian Patent Office dated May 18, 2009 for counterpart Russian Application No. 2006-116506.
Notice of Allowance by Russian Patent Office dated May 28, 2009 for counterpart Russian Application No. 2006-116489.
Notice of Allowance by European Patent Office dated Jun. 3, 2009 for counterpart European Application No. 05 721 896.8.
Article: Information Technology—Generic coding of moving pictures and associated audio information: Systems—published ISO-IEC/13818-1, Dec. 1, 2000.
European Search Report dated Dec. 28, 2009 for counterpart European application.
WC3 "Synchronized Multimedia Integration Language (SMIL) 1.0 Specification".
Blu-Ray Disc "White paper Blu-Ray Disc Format: 1.B Audio Visual application format specifications for BD-ROM".
Office Action by Japanese Patent Office dated Sep. 15, 2009 for counterpart Japanese Application No. 2006-535261.
Office Action by USPTO dated Nov. 25, 2009 for counterpart U.S. Appl. No. 11/070,238.
Office Action dated Jan. 29, 2010 for counterpart Chinese Application 2004-800300922.2.
Office Action dated Mar. 12, 2010 by the Japanese Patent Office for counterpart Japanese Application No. 2006-535258, with English Translation.
Japanese Office Action /Decision to Grant a Patent, dated Nov. 25, 2010, issued for Application No. 2006-535258 and English Translation thereof.
US Office Action dated Jan. 20, 2011 in corresponding U.S. Appl. No. 10/960,486.
ETSI EN 300 743 V.1.2.1 (Oct. 2010): "Digital Video Broadcasting (DVB); Subtitling Systems".
ETSI EN 300 472 V.1.3.1 (May 2003): "Digital Video Broadcasting (DVB); Specification for conveying ITU-R System B Teletext in DVB bitstreams".
U.S. Notice of Allowance dated May 23, 2011 in corresponding U.S. Appl. No. 10/960,486.
Synchronized Multimedia Integration Language (SMIL) 1.0 Specification, Jun. 15, 1998, pp. 1-38.
Chinese Office Action dated May 9, 2008.
Russian Office Action dated Aug. 20, 2008 corresponding to Application No. 2006116506/28(017958).

* cited by examiner

FIG. 6

| Syntax |
|---|
| SubPlayItem ( ) { |
|     length |
|     Clip_Information_file_name● |
|     Clip_Codec_identifier |
|     reserved_for_furture_use |
|     SubPlayItem_type ● |
|     ref_to_STC_id |
|     SubPlayItem_IN_time |
|     SubPlayItem_OUT_time |
|     Application ● |
|     reserved_for_furture_use |
| } |

Clip_Information_file_name ● — Text Subtitle data or Information file

SubPlayItem_type ● — ex : 3 = Text Subtitle

Application ● — Application type (Subtitle, Karaoke..) and/or Language code (English, Korean..)

*Subtitle Language Register*

| bn+31 | bn+30 | bn+29 | bn+28 | bn+27 | bn+26 | bn+25 | bn+24 |
|-------|-------|-------|-------|-------|-------|-------|-------|
| reserved ||||||||
| bn+23 | bn+22 | bn+21 | bn+20 | bn+19 | bn+18 | bn+17 | bn+16 |
| reserved |||||| Subtitle Type ||
| bn+15 | bn+14 | bn+13 | bn+12 | bn+11 | bn+10 | bn+9 | bn+8 |
| Language Code (b15 - b8) ||||||||
| bn+7 | bn+6 | bn+5 | bn+4 | bn+3 | bn+2 | bn+1 | bn+n |
| Language Code (b7 - b0) ||||||||

\* Subtitle Type : 01b = Bitmap Subtitle, 10b = Text Subtitle

FIG. 12

| Syntax |  |  |
|---|---|---|
| PlayItem ( ) { |  |  |
|     . . . . |  |  |
| | Clip_Information_file_name [0] | ●—— Main AV Clip file name |
| | . . . . | |
| | reserved_for_furture_use | |
| | exist_text_subtitle | ●—— 1 = text subtitle exist, 0 = not exist |
| | is_multi_angle | |
| | . . . . | |
| | if (is_multi_angle = = $1_b$) { | ┐ |
| |     . . . . | ├— for multi-angle |
| | } | ┘ |
| | if (exist_text_subtitle = = $1_b$) { | |
| | | number_of_text_subtitles |
| | | reserved_for_future_use |
| | | is_seamless_text_subtitle_change |
| | | Application ●—— Application type( Subtitle, Karaoke..) and/or Language code (English, Korean..) |
| | | for (text_stream_id = 1; |
| | | text_stream_id < number_of_text_subtitles; text_stream_id ++) { |
| | |     Clip_Information_file_name [text_stream_id] |
| | |     . . . . |
| | } | Text Subtitle data or Information file |
| | } | |
| } | | |

FIG. 14

| Syntax |
|---|
| SubPlayItem ( ) { |
|    ... |
|    SubPlayItem_type ————— ex : 3 = Text Subtitle |
|    ... |
|    number_of_text_subtitles |
|    is_seamless_text_subtitle_change |
|    Application ————— Application type (Subtitle, Karaoke..) and/or Language code (English, Korean..) |
|    ... |
|    SubPlayItem_IN_time |
|    SubPlayItem_OUT_time |
|    ... |
|    for (text_stream_id = 1; text_stream_id < number_of_text_subtitles; text_stream_id ++) { |
|       Clip_Information_File_name [text_stream_id] |
|       ... |
|    } |
| } |

FIG. 16

*Text Subtitle Managing Information file*

| Syntax |
|---|
| SubPlayItem ( ) { |
| length |
| Clip_Information_file_name |
| ..... |
| SubPlayItem_type |
| ..... = 3 : Text Subtitle |
| SubPlayItem_IN_time |
| SubPlayItem_OUT_time |
| Application |
| reserved_for_furture_use |
| } |

| Syntax |
|---|
| Text Subtitle Managing Information ( ) { |
| ..... |
| number_of_text_subtitles |
| is_seamless_text_subtitle_change |
| Application |
| ..... |
| for (text_stream_id = 1; text_stream_id<number_of_text_subtitles; text_stream_id ++){ |
| text_stream_file_name[text_stream_id] |
| Clip_Information_file_name[text_stream_id] |
| ..... |
| } |
| } |

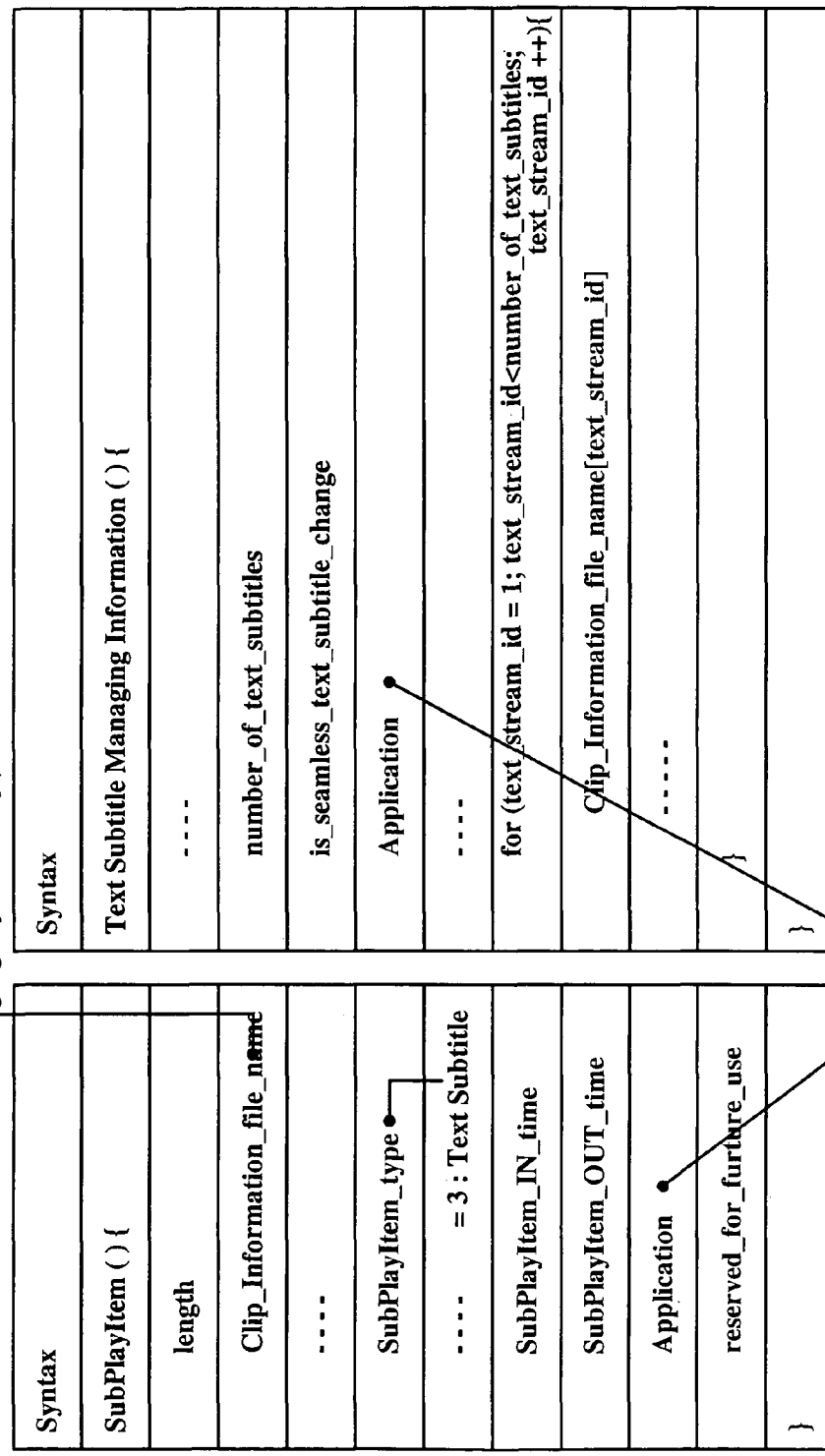

Application type (Subtitle, Karaoke..) and/or
Language code (English, Korean..)

FIG. 19

| Syntax |
|---|
| Text Subtitle Managing Information ( ) { |
| ... |
| number_of_text_subtitles |
| is_seamless_subtitle_change |
| ... |
| for (text_stream_id = 1; text_stream_id<number_of_text_subtitles; text_stream_id ++){ |
| Clip_Information_file_name[text_stream_id] |
| Target_PlayList |
| Target_PlayItem |
| Application |
| ..... |
| } |
| } |

Target_PlayList, Target_PlayItem: Index information PlayList and/or PlayItem linked TXT-ST file

FIG. 20

| Syntax |
|---|
| Text Subtitle Managing Information ( ) { |
|     .... |
|     number_of_text_subtitles |
|     is_seamless_text_subtitle_change |
|     .... |
|     for (text_stream_id = 1; text_stream_id<number_of_text_subtitles; text_stream_id ++){ |
|         Source_Clip_file_URL [text_stream_id]   ←   Original Position of Text Subtitle (disc or Web URL) |
|         Clip_Information_file_name[text_stream_id] |
|         Target_PlayList |
|         Target_PlayItem |
|         Application |
|         ..... |
|     } |
| } |

RECORDING MEDIUM HAVING DATA STRUCTURE FOR MANAGING REPRODUCTION OF AUXILIARY PRESENTATION DATA AND RECORDING AND REPRODUCING METHODS AND APPARATUSES

FOREIGN PRIORITY DATA

The subject application claims priority under 35 U.S.C. 119 on Korean Application No. 10-2003-0071905 filed Oct. 15, 2003; the entire contents of both applications are hereby incorporated by reference.

BACKGROUND OF THE INVENTION

1. Field of the Invention

The present invention relates to high density recording media such as optical discs, and in particular, blu-ray read-only discs.

2. Description of the Related Art

Optical discs that are capable of storing large amounts of high-quality video and audio data, have been available on the market. The digital versatile disc (DVD) is one example of such an optical disc. Recently, DVD players and DVD recorders have been available on the market and have become one of the most popular consumer electronic products.

Auxiliary presentation data such as subtitle information that is to be displayed on screen during playback of a DVD title (e.g., a movie) is, in general, recorded on the DVD as bitmap-formatted image data. During playback of main audio/video data recorded on the digital versatile disc, the auxiliary presentation information is read out from the digital versatile disc and output to an external device such as a TV set after a series of signal processing steps so that the auxiliary presentation data is displayed on the screen of the external device. With a DVD player, a user can choose and watch a desired subtitle on a TV set during reproduction of the DVD title.

Recently, the standardization of new higher density optical discs than DVD, for example blu-ray read-only disc (BD-ROM) has been under development. Standard specifications and methods of providing a great level of flexibility in managing and displaying auxiliary presentation data, which are recorded on the optical disc or supplied from a content provider server through the Internet, have not yet been established.

SUMMARY OF THE INVENTION

A recording medium according to the present invention includes a data structure for managing reproduction of auxiliary presentation data.

In one embodiment, the recording medium stores at least one subplayitem that identifies more than one clip information file name. Each clip information file named by the subplayitem indicates an associated clip of auxiliary presentation data to reproduce from the recording medium, and the auxiliary presentation data in each clip is associated with at least a portion of main presentation data recorded on the recording medium. The subplayitem also indicates a single presentation interval for the associated clips.

In one embodiment, the navigation area also stores at least one playitem that indicates at least a portion of the main presentation data to reproduce. Here, the playitem identifies a clip information file name that indicates a clip of main presentation data to reproduce, and the clip information files identified by the subplayitem and the playitem are separate files.

In another exemplary embodiment, the recording medium stores at least one playlist including navigation information for reproducing main presentation data and auxiliary presentation data associated with the main presentation data. The navigation information also indicates a type of subpath with which the auxiliary presentation data is associated. More specifically, the playlist includes a subplayitem that provides navigation information for reproducing more than one clip of auxiliary presentation data from the recording medium, and the subplayitem indicates a single presentation interval for the associated clips.

In one embodiment, the type of subpath is a text subtitle presentation path.

In a still further embodiment, the recording medium stores separate clips of auxiliary presentation data and at least one separate clip of main presentation data. Here, the auxiliary presentation data is associated with the main presentation data. The recording medium also stores a subplayitem providing navigation information for reproducing the separate clips of auxiliary presentation data for a same presentation interval, and a playitem providing navigation information for reproducing the clip of main presentation data.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the exemplary embodiments of the invention, and together with the description, serve to explain the principles of the present invention. In the drawings:

FIGS. 5 to 20 illustrate embodiments of navigation data structure in accordance with the present invention for linking a plurality of text subtitle streams to a main audio/video stream;

DETAILED DESCRIPTION OF THE EXEMPLARY EMBODIMENTS

In order that the invention may be fully understood, exemplary embodiments thereof will now be described with reference to the accompanying drawings.

Figure 1:
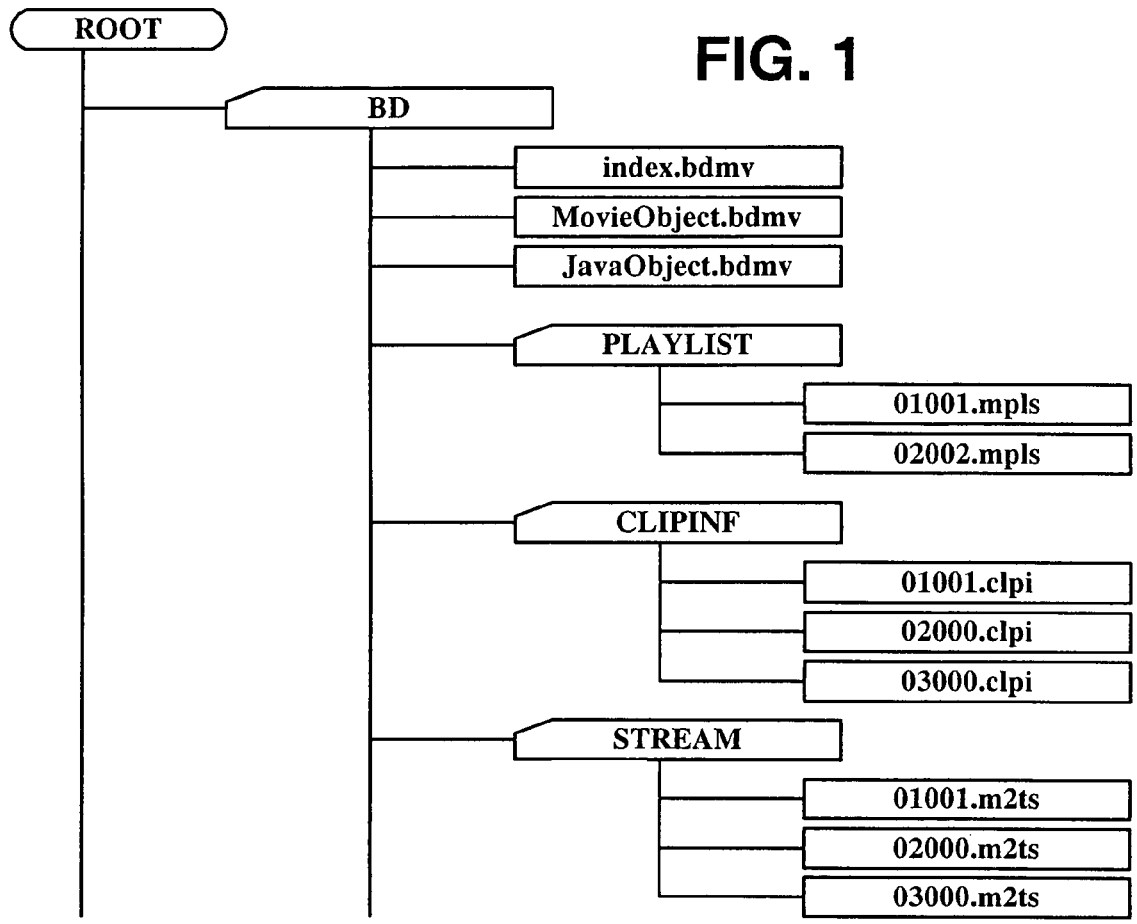
FIGS. 1 to 4 illustrate embodiments of a file system structure, navigation data structure, and disc volume of an optical disc in accordance with the present invention.

The file structure of an optical disc such as a BD-ROM in accordance with one embodiment of the present invention is shown in FIG. 1. The root directory includes, among other things, at least one BD directory. The BD directory includes an index.bdmv file, a MovieObject.bdmv file, a JavaObject.bdmv file, a PLAYLIST directory, a CLIPINF directory, and a STREAM directory. Each of these files and directories will be discussed in detail below.

The PLAYLIST directory includes a plurality of playlist files (*.mpls), the CLIPINF directory including a plurality of clip information files (*.clpi), and the STREAM directory includes a plurality of MPEG2 transport stream formatted audio/video (A/V) stream clip files (*.m2ts). The playlist file is associated with and identifies at least one clip information file. The clip information file, in turn, is associated with and identifies an A/V stream clip file to reproduce.

Figure 2:
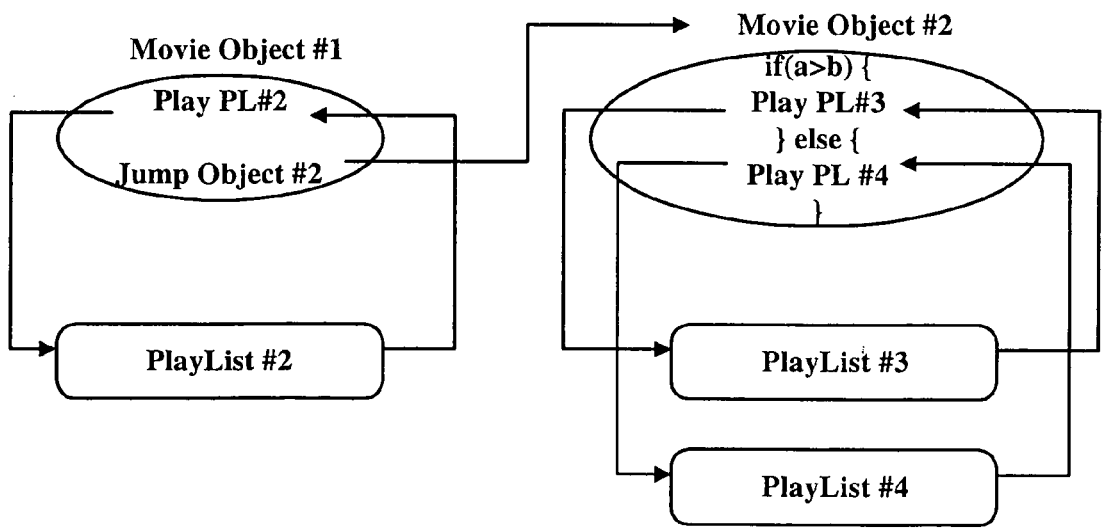

The MovieObject.bdmv or JavaObject.bdmv files include executable navigation commands or a command program for controlling the playback of playlists. FIG. 2 illustrates example movie objects in the MovieObject.bdmv file. As shown in FIG. 2, the navigation commands contained in movie objects includes, among other things, playback of a playlist and jump to another movie object in response to a user's request.

Figure 3:
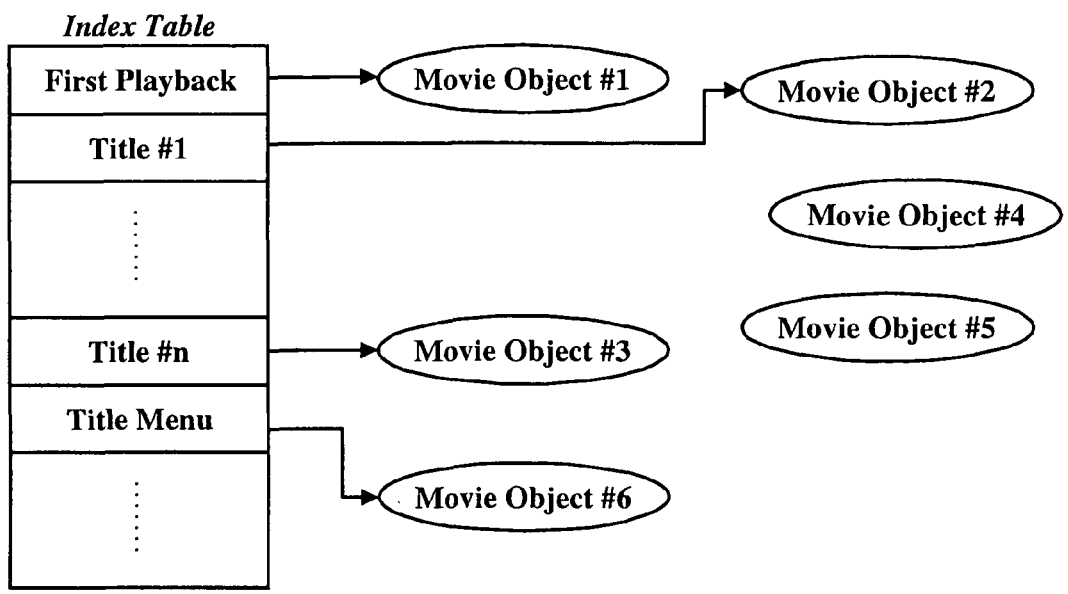

The index.bdmv file links movie and/or Java objects to, for example, a plurality of titles. For example, as shown in FIG. 3, movie objects are linked to elements of an index table that includes, for example, a plurality of titles (title #1 to #n) and a title menu.

Accordingly, the index.bdmv file, MovieObject.bdmv file and/or JavaObject.bdmv file provide a hierarchical structure for controlling the playback of playlists. And, the playlist files and clip information files provide a hierarchical structure for controlling reproduction of A/V stream clip files.

Figure 4:
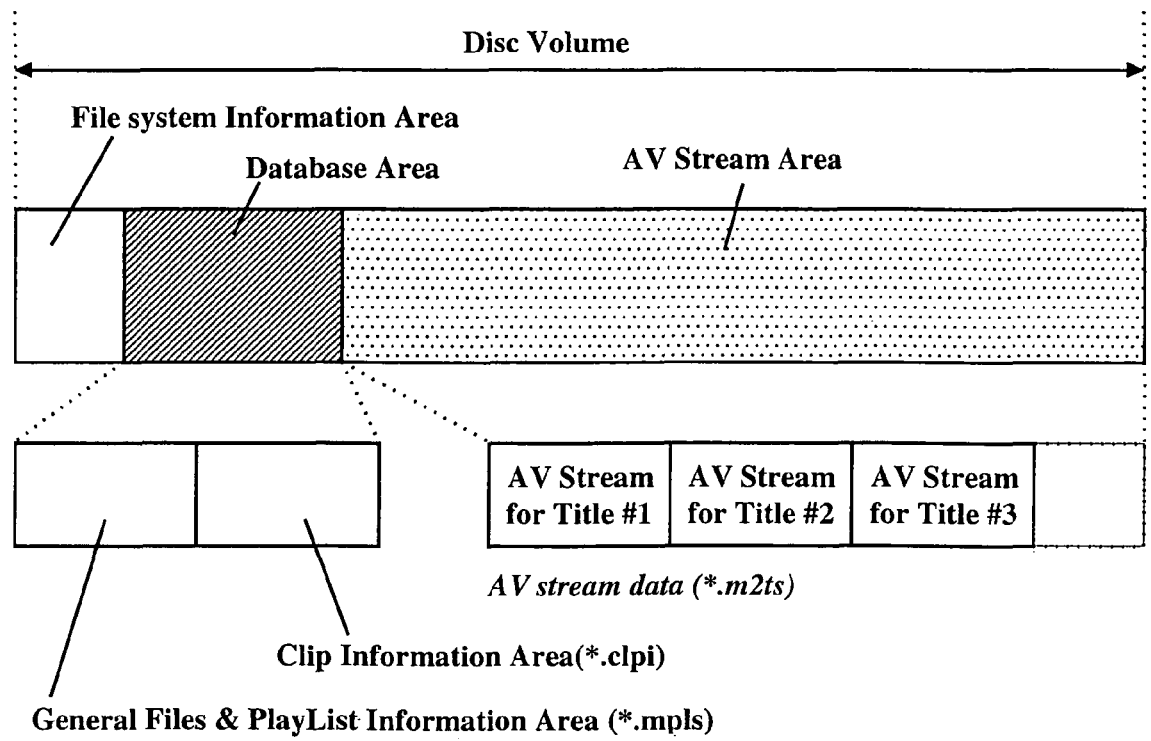

As shown in FIG. 4, the disc volume of a BD-ROM is organized into a file system information area, a database area, and an A/V stream area. The database area includes a general files and playlist information area and a clip information area. The general files and playlist information area stores general files such as the MovieObject.bdmv file and the PLAYLIST directory. The clip information area stores the clip information files. The MPEG2 transport stream formatted clip files (*.m2ts) belonging to titles are stored in the A/V stream area.

In the BD-ROM in accordance with the present invention, in addition to the main video data, auxiliary presentation data such as bitmap-formatted subtitle data, text-formatted subtitle data, and/or etc. may be recorded thereon. Either or both of the bitmap-formatted subtitle data and text-formatted subtitle data (hereinafter referred to as bitmap subtitle and text subtitle, respectively) may be multiplexed with the main video data before it is recorded on the BD-ROM (referred to as 'in-mux') or may be recorded separately thereon with no multiplexing (referred to as 'out-of-mux').

Auxiliary presentation data such as bitmap subtitle data or text subtitle data may also be supplied from a content provider server (CP server) through networks such as the Internet. The text subtitle data from the CP server may be transmitted in the MPEG2 transport stream (TS) format or a predetermined binary stream format like the extensible markup language (XML) format. A plurality of the text subtitle data may be supplied from the CP server so as to provide the subtitles for several different languages. Moreover, streams of another type like audio streams may be supplied from the CP server together with the subtitle data.

In the optical disc reproducing apparatus in accordance with the present invention, the auxiliary presentation data that are either read out from an optical disc or supplied from a CP server may be linked to a main video data in such a way that the auxiliary presentation data are chosen and displayed appropriately, in a various way in response to a user's request while playback of the main video data, which will be described below in detail.

New navigation data structures based on playlist, playitem, subplayitem, or a predetermined structure are defined and used to link the auxiliary presentation data with a main A/V stream being read out from the optical disc.

The navigation data structures are applicable when the auxiliary presentation data is recorded on the BD-ROM or when it is already stored in memory such as a hard disk (HDD), RAM, flash memory, etc. in the optical reproducing apparatus. It is onto this memory that the auxiliary presentation data supplied from the CP server (or read out from the BD-ROM) may be downloaded (or uploaded).

In the case that a text subtitle data stream is stored in the memory, navigation information or linking information required to associate the text subtitle stream on the memory with a main A/V stream may have different representation based on utilization of the uniform resource locator (URL) representation scheme, which will be described below.

The URL-style representation of the linking information may be determined by corresponding the name of a directory in which the text subtitle stream is stored to a Web address of the CP server that supplies the text subtitle stream. For example, if the Web address is 'http://A-studio. com/filename.ext' or 'ftp://A-studio.com/filename.ext', then the URL-style representation becomes 'URL=lid://bd-disc-name/directories/filename.ext', where lid represents local identifier. When the optical disc reproducing apparatus starts to reproduce, the file on the CP server, 'http://A-studio.com/filename.ext' or 'ftp://A-studio.com/filename.ext' may be downloaded automatically in the directory of 'lid://bd-disc-name/directories' on the memory, and the URL-style representation of the linking information becomes 'URL=lid://bd-disc-name/directories/filename.ext'.

As another URL-style representation, the URL-style representation of the linking information may be determined by corresponding the name of directory in which the text subtitle stream is stored to disc name and/or title name and/or chapter number. For example, the URL-style representation becomes 'URL=lid://bd-disc-name/directories or title-name or chapter-number/filename.ext'. When the optical disc reproducing apparatus starts to reproduce an optical disc, the text subtitle stream file recorded thereon may be uploaded automatically in the directory of 'lid://bd-disc-name/directories or title-name or chapter-number' on the local persistent memory. The URL representation becomes 'URL=lid://bd-disc-name/directories or title-name or chapter-number/filename.ext'.

As another URL-style representation, the URL-style representation of the linking information may be determined based on the directory name and/or file name designated by an author. For example, in order to insert a reference to the directory in which the text subtitle stream is recorded on the optical disc and/or a URL address of web pages containing the text subtitle stream on the CP server, the 'directory and/or filename' field may be inserted into a text subtitle clip information or a separate text subtitle directory and file information. Based on the 'directory and/or filename' fields, the text subtitle streams are uploaded and/or downloaded on the memory. In the case, The URL-style representation becomes 'URL=P://directory_1/sub_directory_2/ . . . /filename.ext'.

As another URL-style representation, the HTTP-based or FTP-based directory name may be directly used for the URL-style representation of the linking information. For example, the URL-style representation may become 'URL=http or ftp://A-studio.com/directories/filename.ext'. In this case, the memory may interpret the directory and filenames from the representations of 'http://A-studio.com/directories/filename.ext', or 'ftp://A-studio. com/directories/filename.ext', or 'lid://A-studio.com/directories/filename.ext', or the designated directory and file name that is automatically interpreted in reproduction.

The navigation structures for effectively linking the auxiliary presentation streams that are supplied from the optical disc or the CP server to a main A/V stream recorded on the optical disc are described hereinafter in great detail. For the purposes of example only, each embodiment uses the example of text subtitle data as the auxiliary presentation data.

Figure 5:
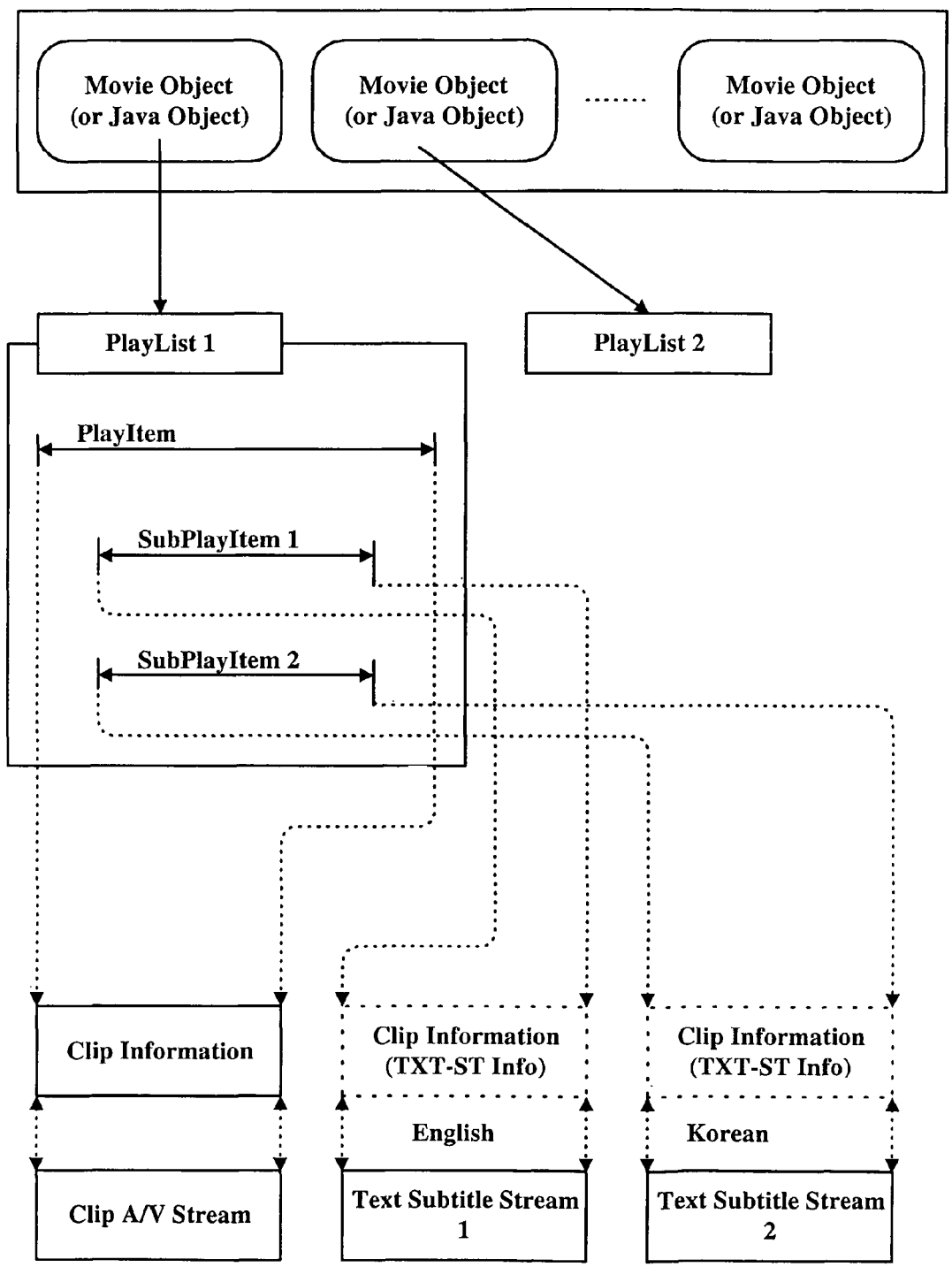

FIG. 5 illustrates a first embodiment of a data structure according to the present invention. As shown, one movie object or Java object is associated with and instructs playback of a playlist. The playlist includes a playitem and a number of subplayitems, two in this example. The playitem is a data structure providing the start or in time and the end or out time for playing back a clip file to which the playitem is indirectly linked. This is graphically represented in FIG. 5 by the double headed arrow labeled PlayItem. Also graphically shown in FIG. 5, the playitem identifies a clip information file, which identifies a clip of the main A/V stream data to reproduce.

Each of the subplayitems belonging to the playlist (SubPlayItem #1, #2) is linked to an associated clip information file. As shown in FIG. 5, the clip information files identified by the subplayitems are for text subtitles, and each clip information file identifies a different text subtitle stream. The different text subtitle streams provide different language text subtitles. For example, in FIG. 5, the first text subtitle steam associated with the first subplayitem provides English language text subtitle data and the second text subtitle stream associate with the second playitem provides Korean language text subtitle data. Accordingly, in this embodiment, a plurality of subplayitems are used to link a plurality of text subtitle streams to the main A/V steam.

In other words, each of the text subtitle streams is associated uniquely with one of the plurality of the subplayitems belonging to a playlist. Choice of a text subtitle stream is made in the playlist layer. The text subtitle stream of a particular language is chosen by selecting a subplayitem belonging to the playlist that is associated with the desired language during reproduction of the main A/V stream pointed by the playitem in the playlist. Accordingly, during reproduction of the main A/V stream, the selected text subtitle data is reproduced.

The clip filename associated with the subplayitem may also be represented by the URL representation scheme. In an alternative embodiment, the clip information of the text subtitle stream may be included in the clip information corresponding to the main A/V stream.

FIG. 6 illustrates an example of the data structure of a subplayitem according this embodiment of the present invention. As shown in FIG. 6, the subplayitem syntax includes, among other things, 'Clip_Information_file_name' field pointing to the text subtitle data or information file, 'SubPlayItem_type' field indicating whether or not the subplayitem is associated with a text subtitle stream (for example, the SubPlayitem type is set to 3 to indicate a text subtitle), and 'Application' field for indicating application-oriented auxiliary information about the text subtitle stream such as an application type of the text subtitle stream (subtitle, karaoke, etc.) and a language code (English, Korean, etc.).

The subplayitem also includes a 'length' field indicating the length of the subplayitem, a 'Clip_Codec_identifier' field indicating the coding of the data, a 'ref_to_STC_id' field indicating a system time id for the clip steam file associated with the subplayitem, and 'SubPlayItem_IN_time' and 'SubPlayItem_OUT_time' fields indicating the presentation in time and presentation out time that define the playback interval of the clip stream file associated with the subplayitem. In this same manner, the playitem defines the presentation interval of the main A/V stream. Referring back to FIG. 5, FIG. 5 graphically represents the presentation interval for each subplayitem by the double headed arrows labeled SubPlayItem 1 and SubPlayItem 2. As shown by FIG. 5, the presentation interval of the subplayitems, and therefore, the text subtitle streams, falls within the presentation interval of the playitem. This graphically conveys that the text subtitle streams are associated with the main A/V stream and are reproduced, when selected, during reproduction of the main A/V stream. The graphical representation used in FIG. 5 will be repeatedly used in graphically representing the other embodiments of the present invention.

Figure 7:
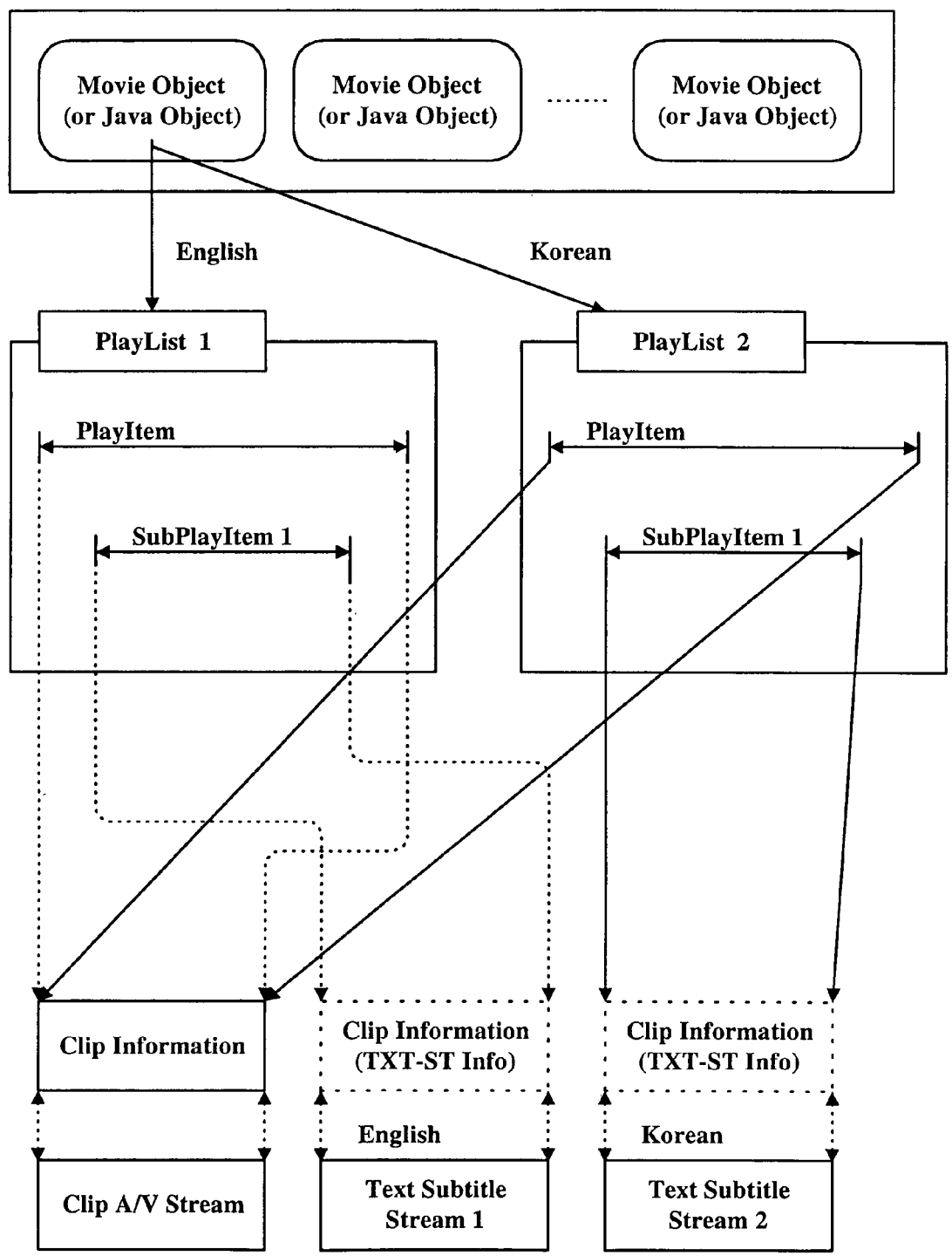

FIG. 7 illustrates a second embodiment of a data structure according to the present invention. In this second embodiment of the present invention, a plurality of playlists are used to link a plurality of text subtitle streams to the main A/V stream. As shown in FIG. 7, one movie object or Java object is associated with a plurality of playlists (PlayList #1, #2 in this example), each including one playitem and one subplayitem. The playitem belonging to each of the plurality of playlists is associated with clip information on the main A/V stream. The plurality of subplayitems are each respectively associated with clip information (i.e., a clip information file), and each clip information corresponds uniquely to one of the plurality of the text subtitle streams of different languages (stream #1 for English and stream #2 for Korean).

In other words, a movie object or Java object is linked to a plurality of playlists, and one subplayitem belonging to each playlist is, in turn, associated uniquely with one of the plurality of text subtitle streams. The text subtitle stream of a particular language is chosen by selecting one playlist in the object layer.

To be specific, only one subplayitem associated with a text subtitle stream may be included in each playlist. For a browsable slide show application, another subplayitem may be included for linking an audio stream. The clip filename associated with the subplayitem may be represented by the URL representation scheme. In an alternative embodiment, the clip information of the text subtitle stream may be included in the clip information corresponding to the main A/V stream.

Figure 8:
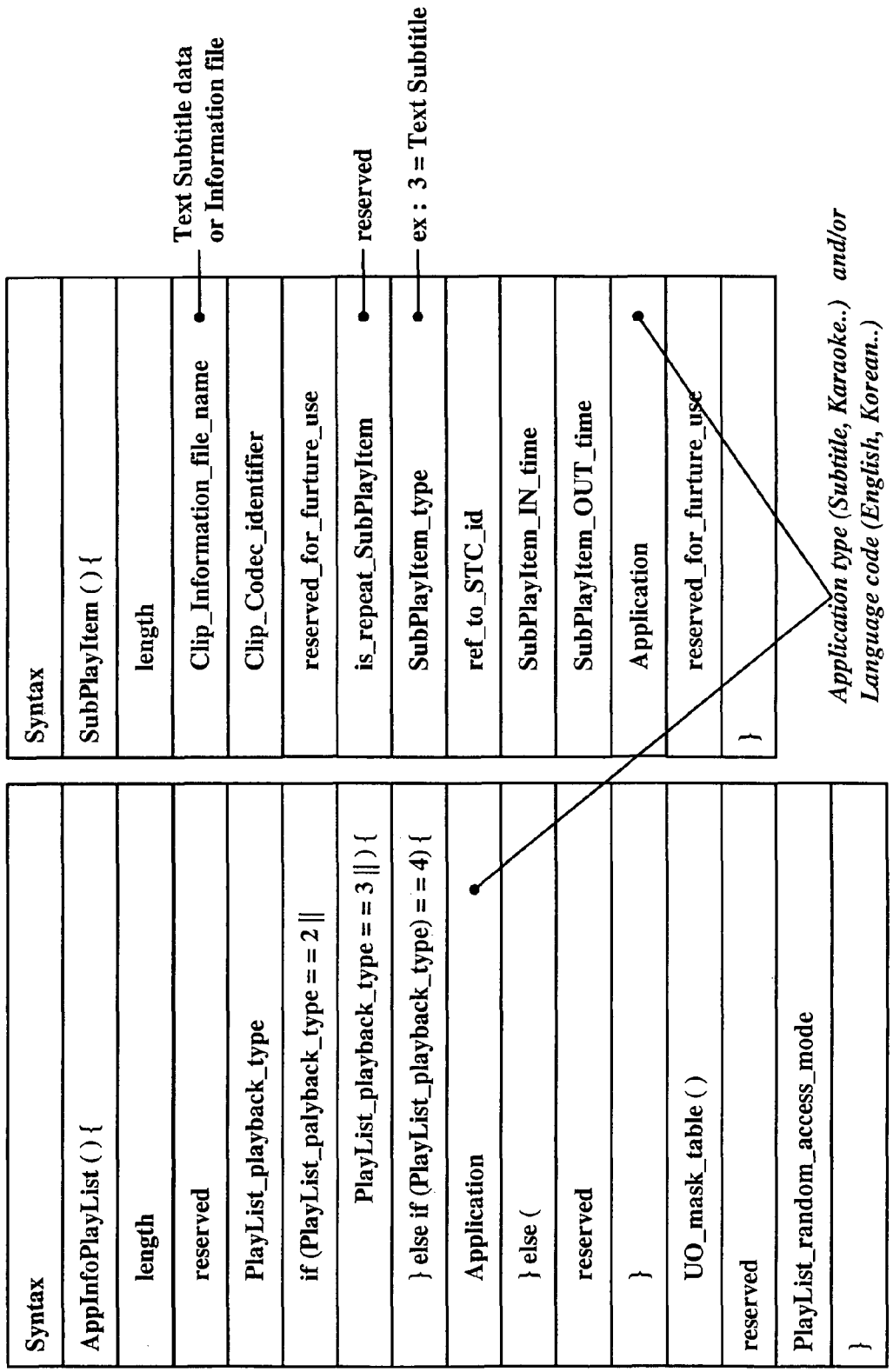

FIG. 8 illustrates an example of the data structure of a subplayitem and a portion of the data structure of a playlist according this embodiment of the present invention As shown in FIG. 8, the subplayitem syntax is the same as the subplayitem syntax described above with respect to FIG. 6 except for the additional field 'is_repeat_SubPlayItem', which is reserved for future use.

The portion of the playlist syntax, AppInfoPlayList, shown in FIG. 8 includes a 'PlayList_playback_type' field for indicating whether or not the 'Application' field is included. For example, if the 'Application' field is included, then the 'PlayList_playback_type' field is set to 4. As shown in FIG. 8, the 'Application' field in the playlist syntax is the same as the 'Application' field in the subplayitem syntax. In this embodiment, the 'Application' field may be included either in the playlist syntax, the subplayitem syntax, or both.

In association with this embodiment, in the object layer, a subtitle language register may exist that indicates the subtitle languages available. Movie object command procedures or Java programs perform changes in the text subtitle stream by changing playlists with reference to the register. An example of such a register is described below with respect to FIG. 10.

Figure 9:
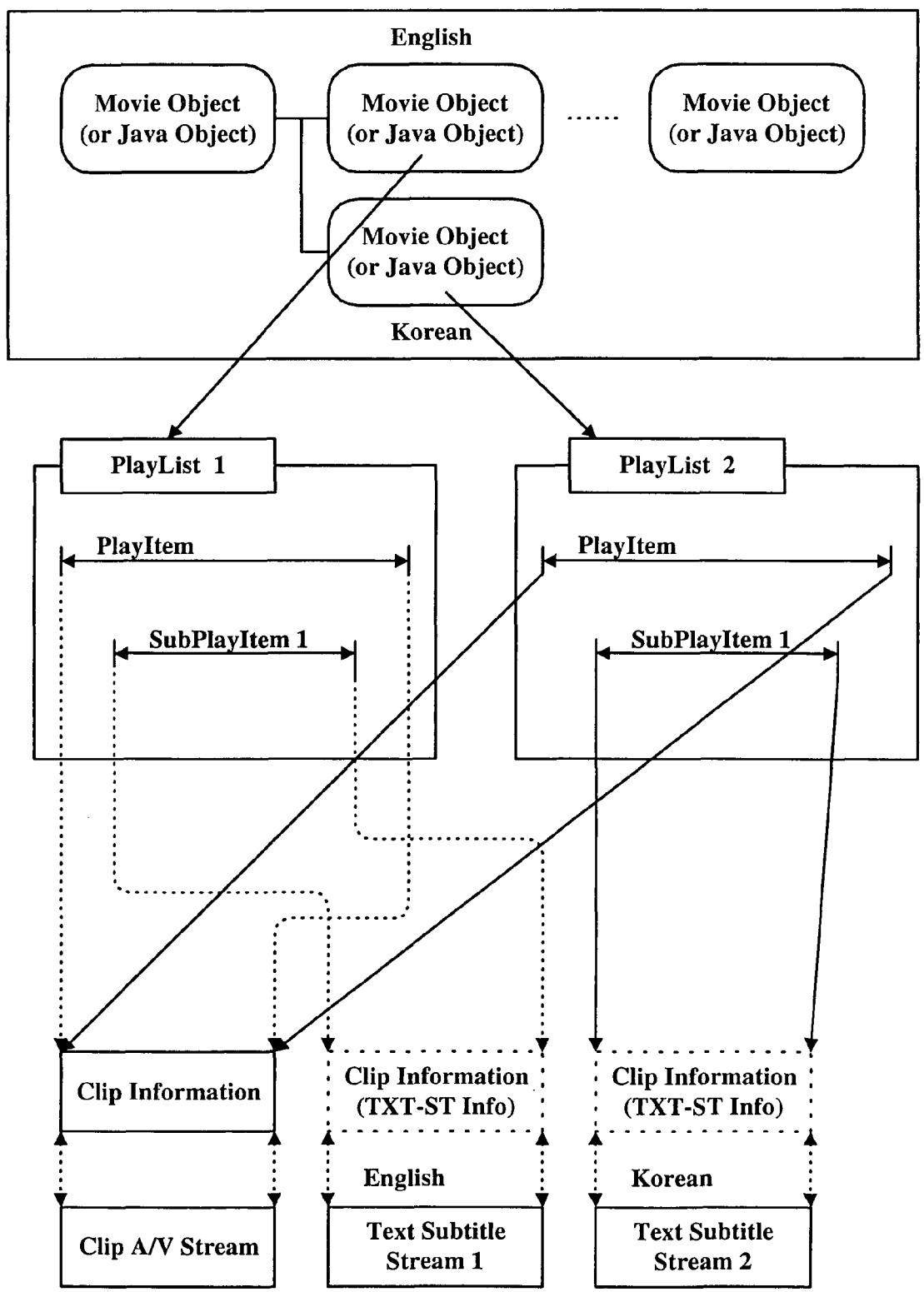

FIG. 9 illustrates a third embodiment of a data structure according to the present invention. In this third embodiment of the present invention, a plurality of objects (movie or Java) are used to link a plurality of text subtitle streams to the main A/V stream. As shown in FIG. 9, the plurality of movie objects or Java objects whose configuration is similar to that of objects for multipath reproduction are each associated uniquely with a playlist (PlayList #1, #2 in this example). The playitem belonging to each playlist is associated with clip information on the main A/V stream. Each playlist also includes a subplayitem associated with clip information that corresponds uniquely to one of the plurality of text subtitle streams of different languages (stream #1 for English and stream #2 for Korean in this example).

In other words, the plurality of movie objects or Java objects are linked respectively to each of the plurality of playlists, and each subplayitem is associated uniquely with one of the plurality of text subtitle streams. The text subtitle stream of a particular language is chosen by changing objects in the object layer.

To be specific, only one subplayitem associated with a text subtitle stream may be included in each playlist. For a browsable slide show application, another subplayitem may be included for linking an audio stream. The clip filename associated with the subplayitem may be represented by the URL representation scheme. In an alternative embodiment, the clip information of the text subtitle stream may also be included in the clip information corresponding to the main A/V stream.

The subplayitem syntax in this embodiment is the same as described above with respect to FIG. 8. For example, the fields of 'Clip_Information_file_name', 'SubPlayitem_type', and 'Application' are included in the playlist syntax and the subplayitem syntax, as described in the second embodiment with reference to FIG. 8. In the object layer, a subtitle language register may exist to indicate the subtitle languages available. Movie object command procedures or Java programs perform changes in the text subtitle streams by changing playlists with reference to the register.

Figures 10, 11:
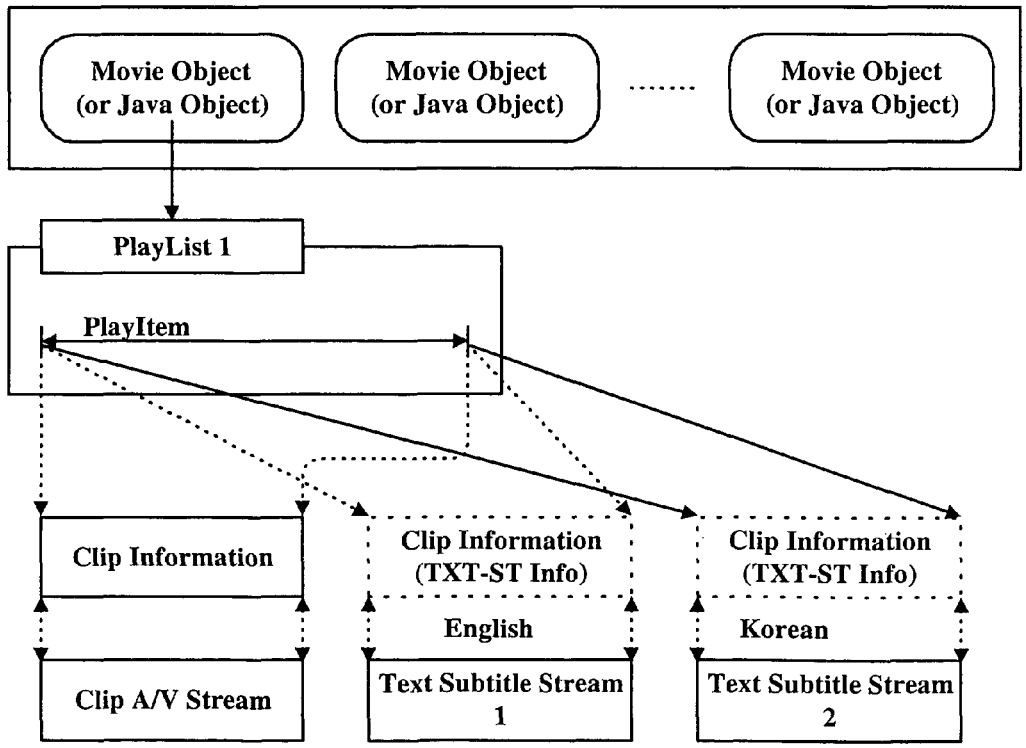

FIG. 10 illustrates an example embodiment of this register. As shown, the subtitle language register includes, among other things, a subtitle type and a language code. For example, if the subtitle type is two bits long and is set to '01', the subtitle type indicates the bitmap-formatted subtitle. If it is set to '10', the subtitle type indicates the text subtitle.

FIG. 11 illustrates a fourth embodiment of a data structure according to the present invention. In this fourth embodiment of the present invention, a playitem is used to link a plurality of text subtitle streams to the main A/V stream. As shown in FIG. 11, one movie object or Java object is associated with a playlist. A single playitem of the playlist is associated with clip information on the main A/V stream. In addition, the playitem is also associated with a plurality of clip information that correspond respectively to each of the plurality of text subtitle streams of different languages (stream #1 for English and stream #2 for Korean in this example).

In other words, the playitem belonging to the playlist is linked to the main A/V stream and the plurality of text subtitle streams. Choice of a text subtitle stream is made in the clip or stream layer. The text subtitle stream of a particular language is chosen by selecting a text subtitle stream file based on the playlist while reproduction of the A/V stream.

The clip filename associated with the playitem may be represented by the URL representation scheme. Also, the clip information of the text subtitle streams may be included in the clip information corresponding to the main A/V stream.

As shown in FIG. 12, the playitem syntax includes, among other things, the clip information filename 'Clip_Information_file_name[0]', an 'exist_text_subtitle' field for indicating whether or not text subtitle streams are included, and an 'is_multi_angle' field for indicating whether the playitem provides multiple camera angle main A/V streams.

If the 'exist_text_subtitle' field indicates that text subtitle streams are included, then the playitem further includes a 'number_of_text_subtitles' field for representing the number of text subtitles, an 'is_seamless_text_subtitle_change' field for indicating if seamless change between text subtitle streams is possible or not, and an 'Application' field as discussed above with respect to FIG. 8. For each text subtitle indicated by the 'number_of_text_subtitles' field, the playitem provides a clip information filename. The clip information filename provides either a name of a clip information file that indicates a clip of a text subtitle stream or directly indicates the name of the clip of text subtitle stream.

Figure 13:
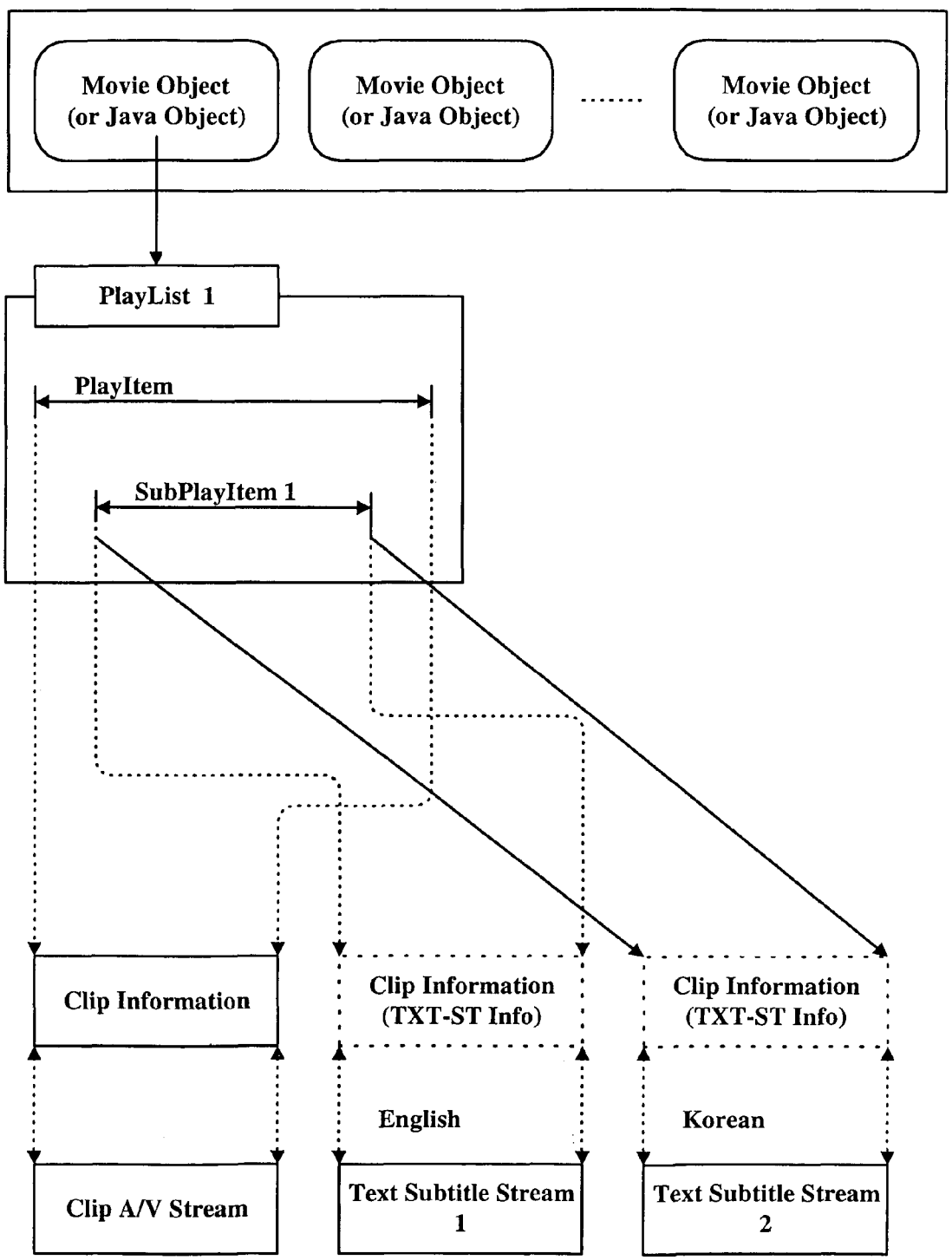

FIG. 13 illustrates a fifth embodiment of a data structure according to the present invention. In this fifth embodiment of the present invention, a subplayitem is used to link a plurality of text subtitle streams to the main A/V stream. As shown in FIG. 13, one movie object or Java object is associated with a playlist. The playitem belonging to the playlist is associated with clip information on the main A/V stream as was described with respect to the first embodiment. A single subplayitem belonging to the playlist is associated with a plurality of clip information files, each corresponding uniquely to one of the plurality of text subtitle streams of different languages (stream #1 for English and stream #2 for Korean in this example). It will be appreciated that the text subtitle streams in this and the other embodiments are not limited to two languages or these two languages.

In other words, one subplayitem belonging to the playlist is linked to the plurality of text subtitle streams. Choice of a text subtitle stream is made in the clip or stream layer. The text subtitle stream of a particular language is chosen by changing text subtitle stream files based on the playlist while reproduction of the A/V stream.

To be specific, only one subplayitem associated with the different text subtitle streams may be included in each playlist. As such, the playback or reproduction interval (e.g., 'SubPlayItem_IN_time' and 'SubPlayItem_OUT_time') is the same for each clip of text subtitle stream.

For a browsable slide show application, another subplayitem may be included for linking an audio stream. The clip filename associated with the subplayitem may be represented by the URL representation scheme. The clip information of the text subtitle streams may also be included in the clip information corresponding to the main A/V stream.

FIG. 14 illustrates an example of the data structure of a subplayitem according this embodiment of the present invention. As shown, the subplayitem syntax includes, among other things, 'SubPlayItem_type' field for indicating whether or not the subplayitem is associated with text subtitle streams (for example, the SubPlayitem_type is set to 3 for text subtitles), a 'number_of_text_subtitles' field for representing the number of text subtitles, an 'is_seamless_text_subtitle_change' field for indicating if seamless change between text subtitle streams is possible or not, and an 'Application' field as described in the previous embodiments.

The subplayitem syntax also includes the 'SubPlayItem_IN_time' and 'SubPlayItem_OUT_time' fields indicating the presentation in time and presentation out time that define the playback or reproduction interval of the clip stream files associated with the subplayitem. Accordingly, when the 'SubPlayItem_type' field indicates the subplayitem is associated with text subtitles, the presentation interval defines the same playback time for each of the text subtitles referenced by the subplayitem. For each text subtitle provided by the 'number_of_text_subtitles' field, the subplayitem provides a clip information filename. The clip information filename provides either a name of a clip information file that indicates a clip of a text subtitle stream or directly indicates the name of the clip of a text subtitle stream.

Figure 15:
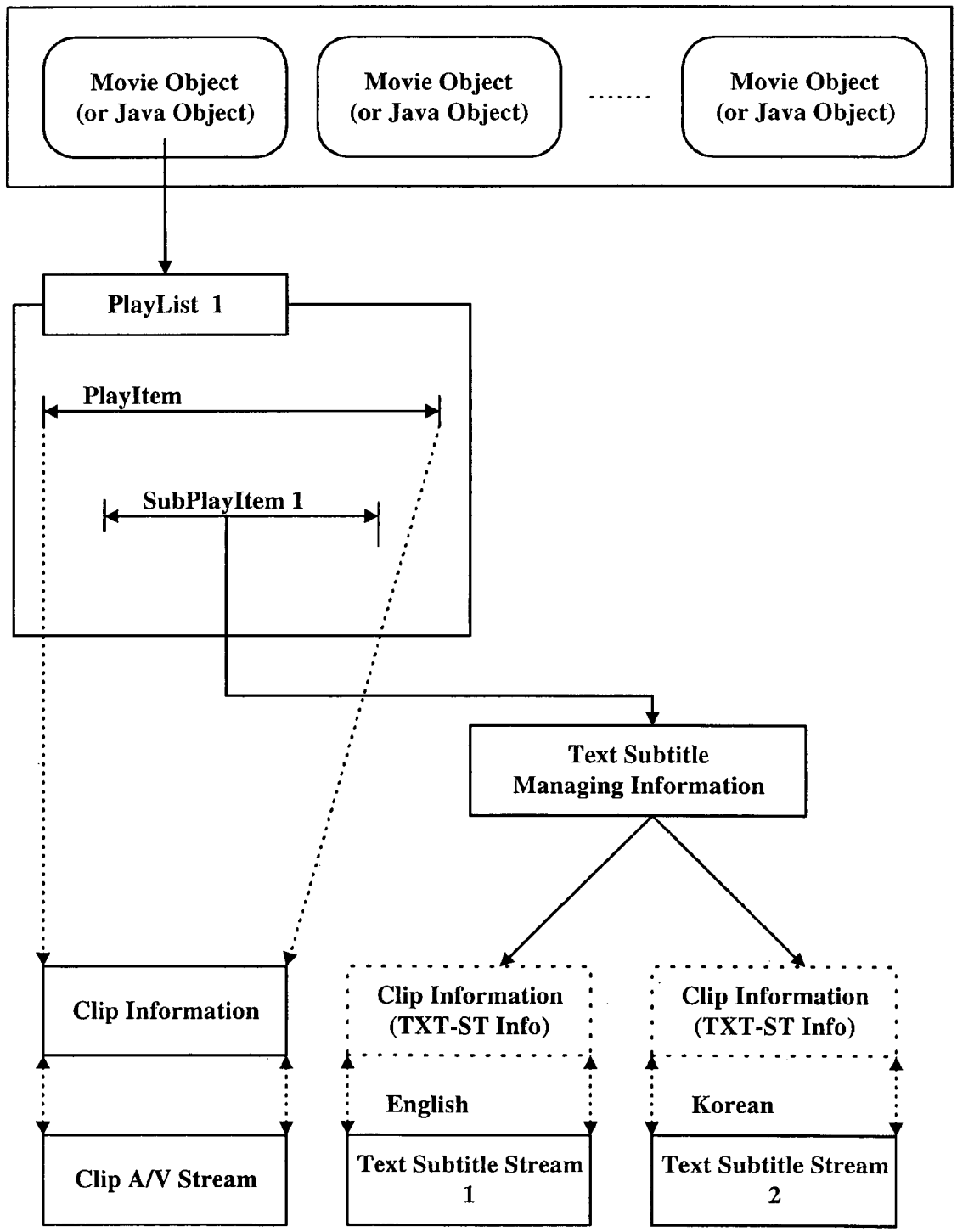

FIG. 15 illustrates a sixth embodiment of a data structure according to the present invention. In this sixth embodiment of the present invention, an additional text subtitle management information data structure is used to link a plurality of text subtitle streams to the main A/V stream. As shown in FIG. 15, one movie object or Java object is associated with a playlist. One playitem of the playlist is associated with clip information on the main A/V stream. A single subplayitem belonging to the playlist is linked to the text subtitle management information. The text subtitle management information is, in turn, associated with a plurality of clip information, each corresponding uniquely to one of the plurality of text subtitle streams of different languages (stream #1 for English and stream #2 for Korean in this example).

In other words, a text subtitle management information layer is added to manage the text subtitle streams. The text subtitle management information is referenced based on the subplayitem in the playlist layer. Each playlist includes a single subplayitem associated with the text subtitle management information.

For a browsable slide show application, another subplayitem may be included for linking an audio stream. The clip filename associated with the subplayitem_may be represented by the URL representation scheme. The clip information of the text subtitle streams may also be included in the clip information corresponding to the main A/V stream.

FIG. 16 illustrates an example of the data structure of a subplayitem and the text subtitle management information according this embodiment of the present invention. As shown in FIG. 16, the subplayitem syntax includes, among other things, a 'length' field indicating the length of the subplayitem, a 'Clip_Information_file_name' field for storing the text subtitle management information filename, a 'SubPlayItem_type' field for indicating whether or not the subplayitem is associated with text subtitle streams (for example, the SubPlayItem_type is set to 3 to indicate text subtitle streams), the 'SubPlayItem_IN_time' and 'SubPlayItem_OUT_time' fields as described in the previous embodiments, and an 'Application' field as described in the previous embodiments.

The syntax of text subtitle management information includes, among other things, a 'number_of_text_subtitles' field for representing the number of text subtitles, an 'is_seamless_text_subtitle_change' field for indicating if seamless change between text subtitle streams is possible or not, and an 'Application' field as described in previous embodiments. For each text subtitle provided by the 'number_of_text_subtitles' field, the subplayitem provides a clip information filename. The clip information filename provides either a name of a clip information file that indicates a clip of a text subtitle stream or directly indicates the name of the clip of a text subtitle stream. The 'Application' field is included either in the subplayitem syntax or in the text subtitle management information syntax.

Figure 17:
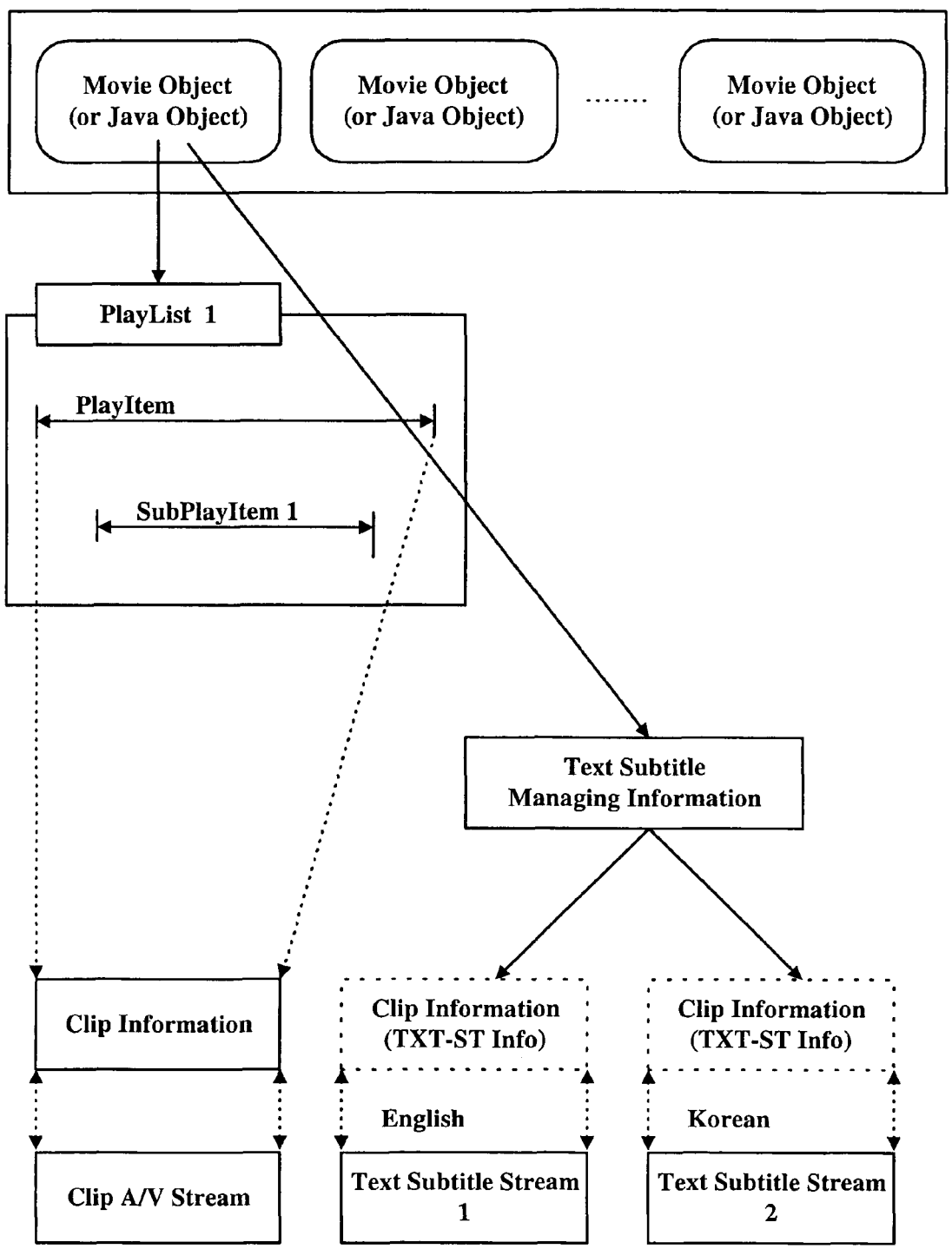

FIG. 17 illustrates a seventh embodiment of a data structure according to the present invention. In this seventh embodiment of the present invention, an additional text subtitle management information data structure is associated with an object in the object layer, and is used to link a plurality of text subtitle streams to the main A/V stream. As shown in FIG. 17, a movie object or Java object is associated with a playlist, and one playitem belonging to the playlist is associated with clip information on the main A/V stream. The clip filename of the movie object or Java object may be represented by the URL representation scheme. The movie object or Java object is also directly linked to the text subtitle management information. The text subtitle management information is, in turn, associated with a plurality of clip information, each corresponding uniquely to one of the plurality of text subtitle streams of different languages (stream #1 for English and stream #2 for Korean in this example).

The text subtitle management information is defined in the object layer, and therefore the plurality of the text subtitle streams are managed in the text subtitle management information layer. In this embodiment, the text subtitle management information has the same syntax as described above with respect to FIG. 16.

Figure 18:
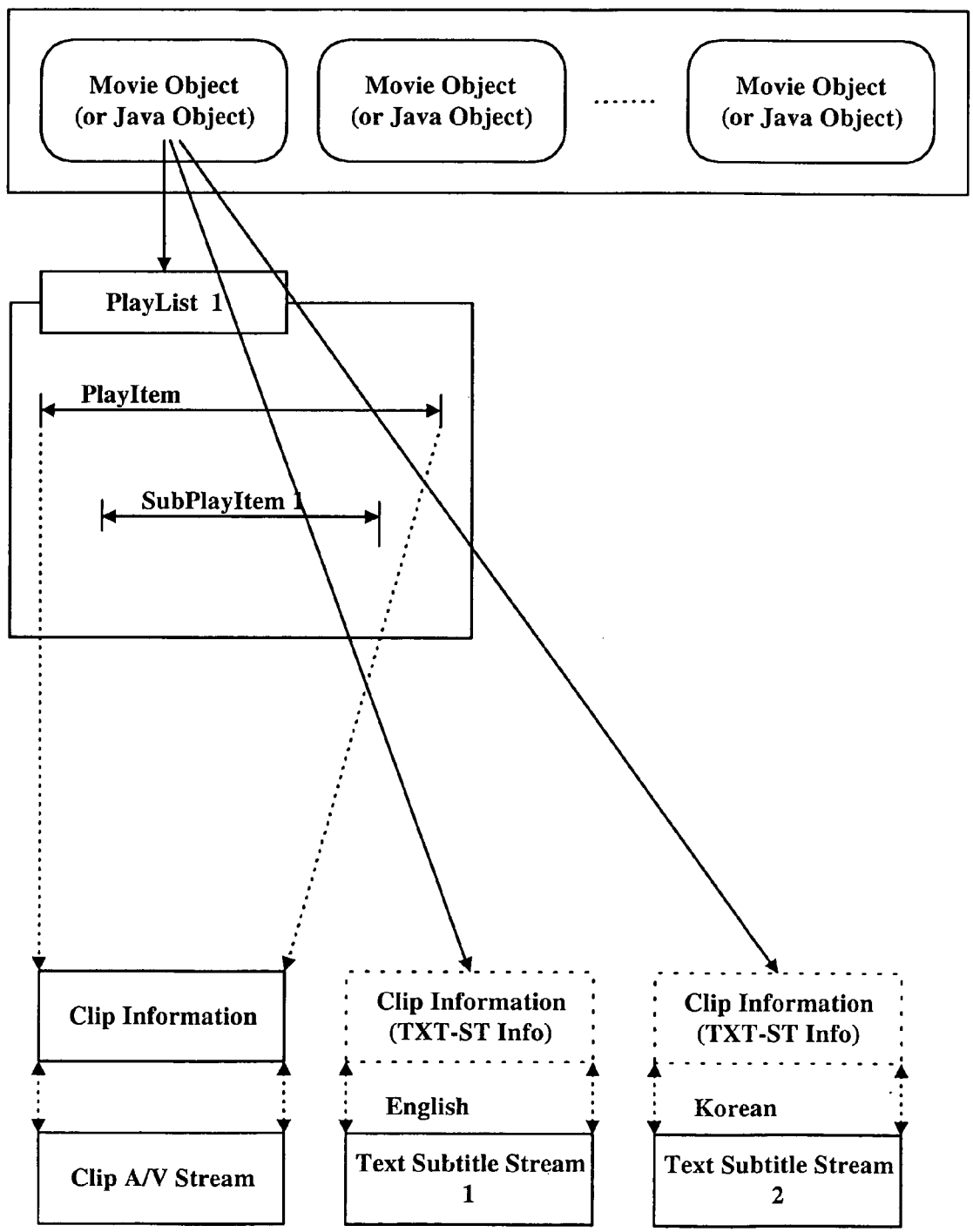

FIG. 18 illustrates an eighth embodiment of a data structure according to the present invention. In this eighth embodiment of the present invention, an additional text subtitle management information data structure included in the movie object or Java object is used to link a plurality of text subtitle streams to the main A/V stream. As shown in FIG. 18, a movie object or Java object is associated with a playlist, and one playitem belonging to the playlist is associated with clip information on the main A/V stream. Based on the text subtitle management information, the movie object or Java object is directly associated with a plurality of clip information, each corresponding uniquely to one of the plurality of text subtitle streams of different languages (stream #1 for English and stream #2 for Korean in this example).

The text subtitle management information is referenced and the plurality of text subtitle streams are managed in the object layer. The clip filename in the movie object or Java object may be represented by the URL representation scheme.

FIG. 19 illustrates an example of the data structure the text subtitle management information according this embodiment of the present invention. As shown, the syntax of text subtitle management information includes, among other things, a 'number_of_text_subtitles' field for representing the number of text subtitles, and an 'is_seamless_text_subtitle_change' field for indicating if seamless change between text subtitle streams is possible or not.

For each text subtitle provided by the 'number_of_text_subtitles' field, the subplayitem provides a 'Clip_Information_file_name' field, a 'Target_PlayList' field, a 'Target_PlayItem' field and an 'Application' field. The clip information filename provides either a name of a clip information file that indicates a clip of a text subtitle stream or directly indicates the name of the clip of a text subtitle stream. The 'Application' field is the same as described in previous embodiments. The 'Target_PlayList' and 'Target_PlayItem' fields are for storing index information of the playlists and/or playitems that are associated in one-to-one correspondence with the plurality of text subtitle streams.

FIG. 20 illustrates another example embodiment of the data structure for the text subtitle management information. As shown in FIG. 20, the syntax of the text subtitle management information according to this embodiment is the same as in FIG. 19 except that for each text subtitle stream indicated by the 'number_of_text_subtitles' field, the syntax may further include a 'Source_Clip_file_URL' field for storing location information of the text subtitle streams; for example, a directory in the high-density optical disc or a URL address on the world wide web.

Figure 21:
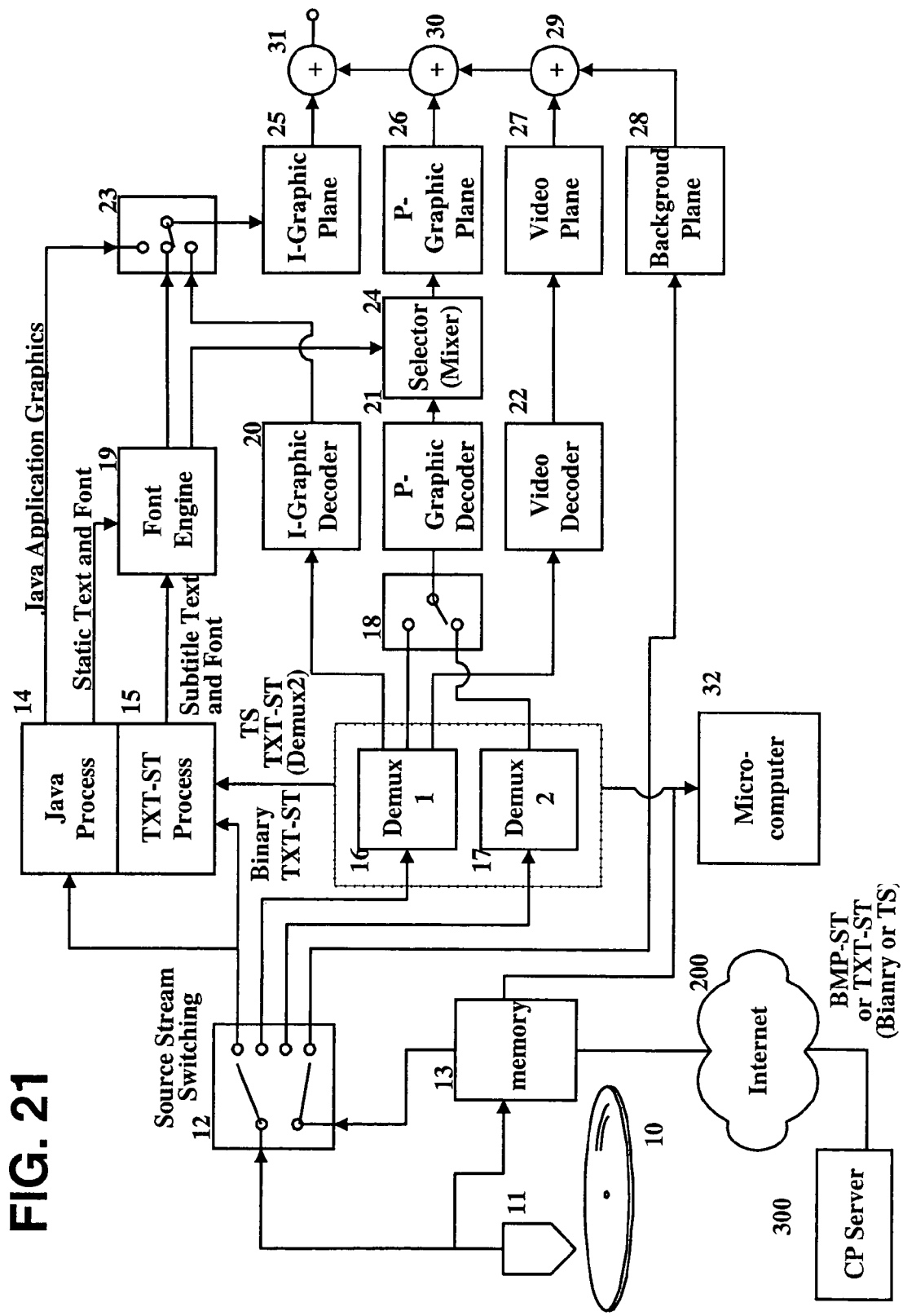
FIG. 21 illustrates a block diagram of the optical disc reproducing apparatus in accordance with the present invention.

FIG. 21 illustrates an optical disc reproducing apparatus according to an embodiment of the present invention. As shown, the apparatus includes an optical pickup 11 for reading out data from a BD-ROM 10; a source stream switch 12; a memory 13; a Java processor 14; a text subtitle processor 15; a first demultiplexer (demux) 16; a second demultiplexer (demux) 17; a presentation graphic source switch 18; a font engine 19; an interactive graphic decoder 20; a presentation graphic decoder 21; a video decoder 22; an interactive graphic data switch 23; a presentation graphic data selector 24; an interactive graphic plane 25; a presentation graphic plane 26; a video plane 27; a background plane 28; several mixers 29, 30, 31, and a microcomputer 32.

The optical disc reproducing apparatus may be connected to a CP sever 300 through the internet 200. The CP server 300 supplies bitmap subtitle streams or text subtitle streams that may be in the MPEG2 TS stream format or a predetermined binary stream of XML format.

The navigation data described before with reference to FIGS. 5-19 is read out from the BD-ROM 10. Based on the navigation data to link the text subtitle streams to the main A/V streams, the microcomputer 32 performs a series of control operations to reproduce the text subtitle stream that is read out from the BD-ROM and/or supplied from the CP server 300 during reproduction of the main A/V stream.

The text subtitle stream from the CP server 300 may be a multiplexed stream of multiple language text subtitle streams only or a multiplexed stream of text subtitle streams and audio streams. The bitmap or text subtitle streams supplied from the CP server 300 are uploaded to memory 13, which is a HDD, RAM, flash memory, etc.

The decoding process of the bitmap and text subtitle streams will be described below in detail. A text subtitle stream recorded on a BD-ROM in the MPEG2 TS stream format separately from main A/V stream is read out from the BD-ROM and may then be uploaded to the memory 13. The text subtitle stream is then supplied to the text subtitle processor 15 through the source stream switch 12 and the second demux 17. The text subtitle processor 15 may be configured as a component of the Java processor 14 or a separate text processor as shown.

Based on the text subtitle stream processed by the text subtitle processor 15, font presentation graphic data are generated from the font engine 19 and then input to the presentation graphic data selector 24. Presentation graphic data corresponding to, e.g., a bitmap subtitle stream may also supplied to the presentation graphic data selector 24 from the memory 13 through the switch 12, the first demux 16 or second demux 17, the presentation graphic source switch 18 and the presentation graphic decoder 21. As will be appreciated, the presentation graphic decoder 21 decodes the presentation graphic data. The presentation graphic data selector 24 in one embodiment selectively chooses one of the presentation graphic data from the font engine 19 (text subtitle graphic data) or from the presentation graphic decoder 21 (bitmap subtitle graphic data), and supplies this data to the presentation graphic plane 26.

Meanwhile, reproduced background data (if any) is supplied by the switch 12 to a background plane 28, and reproduced A/V data is supplied by the switch 12 to the video decoder 22 via the first demux 16. The video decoder 22 decodes the A/V data. The mixer 29 mixes the decoded A/V data with the background data (if any). The mixer 30 mixes the output of the mixer 29 with the output from the presentation graphic plane 26.

In this manner, either bitmap subtitles or text subtitles may be displayed together with main video pictures. As alluded to before, both the text subtitle stream and the bitmap subtitle stream may be supplied from the CP server 300.

When a text subtitle stream has been recorded on a BD-ROM in a predefined binary format such as XML, the text subtitle stream is uploaded to the memory 13 and then supplied directly to the text subtitle processor 15 bypassing the second demux 17. Based on the output of the text subtitle processor 15, font presentation graphic data are generated from the font engine 19 and then input to the presentation graphic data selector 24. Here, either presentation graphic data from the font engine 19 (text subtitle graphic data) or from the presentation graphic decoder 21 (bitmap subtitle graphic data) is chosen selectively as output. The output of the presentation graphic data selector 24 is supplied to the presentation graphic plane 26 so that either bitmap subtitles or text subtitles may be displayed together with main video pictures. This is accomplished by mixer 30 which mixes the output from mixer 29 and the presentation graphics plane 26. Also, both or either of the text subtitle stream and bitmap subtitle streams may be supplied from the CP server 300.

Interactive graphic data such as menu selector button are supplied to the interactive graphic decoder 20 through the demux 16, and the output of the interactive graphic decoder 20 is input to the interactive graphic data switch 23. Interactive graphic data may also be supplied from the Java processor 14 and/or the font engine 19, and are input to the interactive graphic data switch 23. The interactive graphic data switch 23 determines which input is chosen as an output to the interactive graphic plane 25. The output from the interactive graphics plane 25 is then mixed by mixer 31 with the output from mixer 30.

Figure 22:
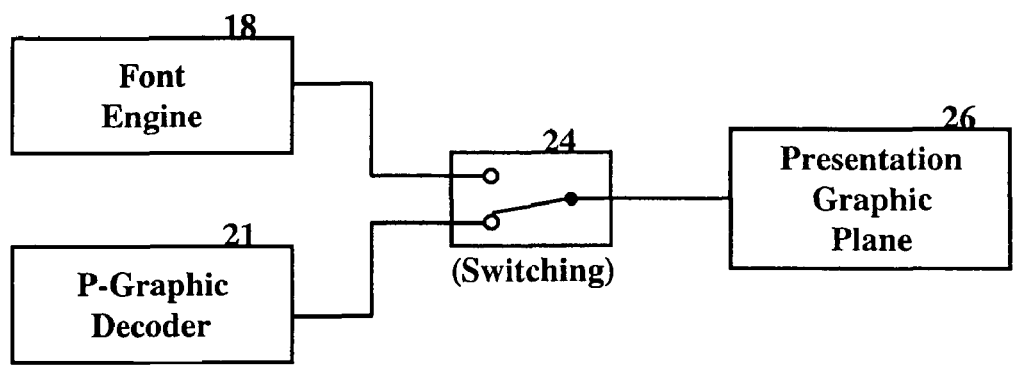
FIGS. 22 to 24 illustrate block diagrams of embodiments of partial components of the optical disc reproducing apparatuses in accordance with the present invention.
Figure 23:
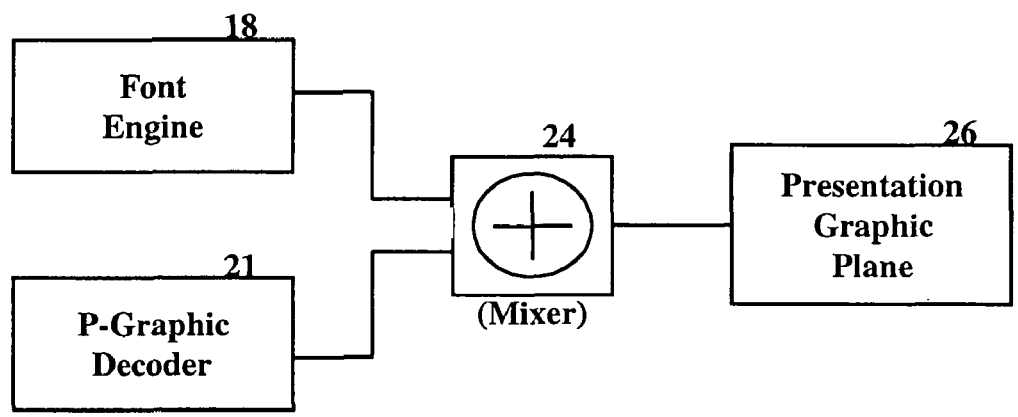
Figure 24:
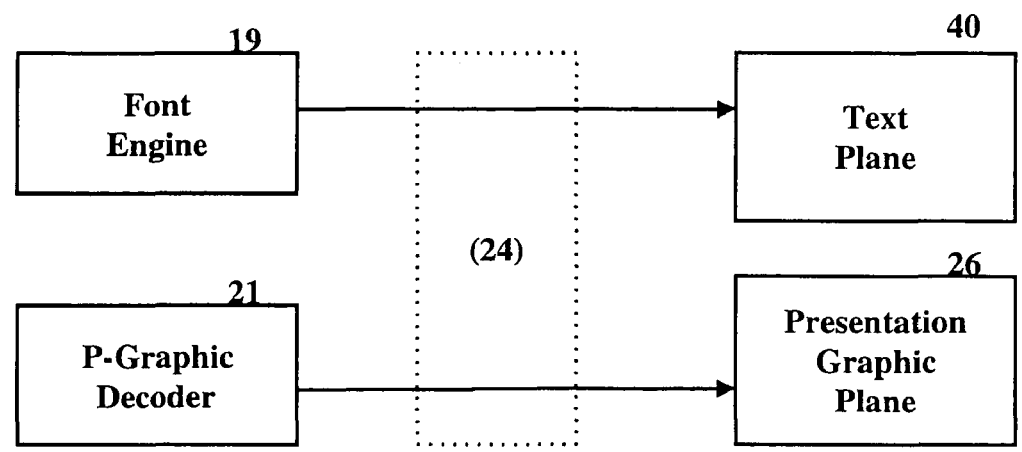

The interactive graphic data selector 24 may be implemented as a switch or as a mixer, as shown in FIGS. 22 and 23, respectively. To be specific, while a text subtitle and a bitmap subtitle may not be displayed simultaneously if the switch embodiment is adopted, the mixer embodiment enables the two subtitles to be displayed simultaneously on non-overlapping regions of a screen. Furthermore, instead of using the interactive graphic data selector 24, a text presentation plane 40 may be additionally used as shown in FIG. 24 so as to display the text subtitle supplied from the font engine 19. As will be appreciated, this embodiment also uses an additional mixer to mix the output from the text presentation plane 40 and the mixer 31. In the configuration of FIG. 24, the text subtitles and bitmap subtitles may be displayed independently of each other.

The present invention provides a recording medium having a data structure for managing the reproduction of auxiliary presentation data, and provides methods and apparatuses for recording the data structure on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disc having a data structure for managing reproduction of text subtitle data, the optical disc comprising:
    a navigation area storing at least one subplayitem, the subplayitem identifying at least one clip information file associated with at least one text subtitle data file including the text subtitle data recorded on the optical disc,
    the text subtitle data in the text subtitle data file being associated with at least a portion of main presentation data in a main file recorded on the optical disc,
    wherein each clip information file identified by the subplayitem is separated from each text subtitle file and has a one to one correspondence with a respective subtitle data file,
    wherein the subplayitem specifies a presentation interval for associated text subtitle data and the subplayitem includes fields indicating data coding information and a system time identifier for the associated text subtitle data, wherein a graphic-subtitle data is multiplexed with the main presentation data in the main file whereas the text subtitle data is included in the text subtitle data file separated from the main file, and either the text subtitle data or the graphic-subtitle data is displayed together with the main presentation data.

2. The optical disc of claim 1, wherein the navigation area stores at least one playitem, the playitem identifying a clip information file associated with the main file recorded on the optical disc.

3. The optical disc of claim 2, wherein the clip information files identified by the subplayitem and the clip information file identified by the playitem are different.

4. The optical disc of claim 2, wherein the navigation area stores at least one playlist, the playlist including the playitem and the subplayitem.

5. The optical disc of claim 4, wherein the playlist indicates a type of subpath with which the subplayitem is associated.

6. The optical disc of claim 5, wherein the type of subpath is a text subtitle presentation path.

7. The optical disc of claim 1, wherein the text subtitle data is stored as transport packets.

8. A method of recording a data structure for managing reproduction of text subtitle data on an optical disc, the method comprising:

recording at least one subplayitem on the optical disc, the subplayitem identifying at least one clip information file associated with at least one text subtitle data file including the text subtitle data recorded on the optical disc the text subtitle data in the text subtitle data file being associated with at least a portion of main presentation data in a main file recorded on the optical disc, wherein each clip information file identified by the subplayitem is separated from each text subtitle data file and has a one to one correspondence with a respective text subtitle data file, wherein the subplayitem specifies a presentation interval for associated text subtitle data and the subplayitem includes fields indicating data coding information and a system time identifier for the associated text subtitle data, wherein a graphic-subtitle data is multiplexed with the main presentation data in the main file whereas the text subtitle data is included in the text subtitle data file separated from the main file, and either the text subtitle data or the graphic subtitle data is displayed together with the main presentation data.

9. A method of reproducing a data structure for managing reproduction of text subtitle data from an optical disc, the method comprising:

reproducing at least one subplayitem from the optical disc, the subplayitem identifying at least one clip information file associated with at least one text subtitle data file including the text subtitle data recorded on the optical disc, the text subtitle data in the text subtitle data file being associated with at least a portion of main presentation data in a main file recorded on the optical disc, wherein each clip information file identified by the subplayitem is separated from each text subtitle data file and has a one to one correspondence with a respective text subtitle data file, wherein the subplayitem specifies a presentation interval for associated text subtitle data and the subplayitem includes fields indicating data coding information and a system time identifier for the associated text subtitle data, wherein a graphic subtitle data is multiplexed with the main presentation data in the main file whereas the text subtitle data is included in the text subtitle data file separated from the main file, and either the text subtitle data or the graphic subtitle data is displayed together with the main presentation data.

10. The method of claim 9, further comprising:
reproducing at least one playitem, the playitem identifying a clip information file associated with the main file recorded on the optical disc.

11. The method of claim 10, wherein the clip information files identified by the subplayitem and the clip information file identified by the playitem are different.

12. The method of claim 10, further comprising:
reproducing at least one playlist, the playlist including the playitem and the subplayitem.

13. The method of claim 12, wherein the playlist indicates a type of subpath with which the subplayitem is associated.

14. An apparatus for reproducing a data structure for managing reproduction of text subtitle data from an optical disc, the apparatus comprising:

a pickup configured to reproduce data recorded on the optical disc; and a controller, operatively coupled to the pickup, configured to control the pickup to reproduce at least one subplayitem from the optical disc, the subplayitem identifying at least one clip information file associated with at least one text subtitle data file including the text subtitle data recorded on the optical disc, the text subtitle data in the text subtitle data file being associated with at least a portion of main presentation data in a main file recorded on the optical disc, wherein each clip information file identified by the subplayitem is separated from each text subtitle data file, and has a one to one correspondence with a respective text subtitle data file, wherein the subplayitem specifies a presentation interval for associated text subtitle data and the subplayitem includes fields indicating data coding information and a system time identifier for the associated text subtitle data, wherein a graphic subtitle data is multiplexed with the main presentation data in a main file whereas the text subtitle data is included in the text subtitle data file separated from the main file, and either the text subtitle data or the graphic subtitle data is displayed together with the main presentation data.

15. The apparatus of claim 14, wherein the controller is configured to control the pickup to reproduce at least one plavitem, the playitem identifying a clip information file associated with the main file recorded on the optical disc.

16. The apparatus of claim 15, wherein the clip information files identified by the subplayitem and the clip information file identified by the playitem are different.

17. The apparatus of claim 15, wherein the controller is configured to control the pickup to reproduce at least one playlist which includes the playitem and the subplayitem.

18. The apparatus of claim 17, wherein the controller is configured to control the pickup to reproduce the playlist indicating a type of subpath with which the subplayitem is associated.

19. An apparatus for recording a data structure for managing reproduction of text subtitle data on an optical disc, the apparatus comprising:

a pickup configured to record data on the optical disc; and
a controller, operatively coupled to the pickup, configured to control the pickup to record at least one subplayitem on the optical disc, the subplayitem identifying at least one clip information file associated with at least one text subtitle data file including the text subtitle data recorded on the optical disc, the text subtitle data in the text subtitle data file being associated with at least a portion of main presentation data in a main file recorded on the optical disc, wherein each clip information file identified by the subplayitem is separated from each text subtitle data file and has a one to one correspondence with a respective text subtitle data file, wherein the subplayitem specifies a presentation interval for associated text subtitle data and the subplayitem includes fields indicating data coding information and a system time identifier for the associated clips of text subtitle data, wherein a graphic subtitle data is multiplexed with the main presentation data in a main file whereas the text subtitle data is included in the text subtitle data file separated from the main file, and either the text subtitle data or the graphic subtitle data is displayed together with the main presentation data.

20. The method of claim 19, further comprising:
recording at least one playitem on the optical disc, the playitem identifying a clip information file associated with the main file including the main presentation data.

21. The method of claim 20, wherein the clip information files identified by the subplayitem and the clip information file identified by the playitem are different.

22. The method of claim 20, further comprising:
recording at least one playlist, the playlist including the playitem and the subplayitem.

23. The method of claim 22, wherein the playlist indicates a type of subpath with which the subplayitem is associated.

24. The apparatus of claim 19, wherein the controller is configured to control the pickup to record at least one playitem identifying a clip information file associated with the main file recorded on the optical disc.

25. The apparatus of claim 24, wherein the clip information files identified by the subplayitem and the clip information file identified by the playitem are different.

26. The apparatus of claim 24, wherein the controller is configured to control the pickup to record at least one playlist which includes the playitem and the subplayitem.

27. The apparatus of claim 26, wherein the controller is configured to control the pickup to record the playlist indicating a type of subpath with which the subplayitem is associated.

* * * * *